United States Patent
Weber et al.

(10) Patent No.: US 11,782,156 B2
(45) Date of Patent: Oct. 10, 2023

(54) LENS ASSEMBLY WITH INTEGRATED FEEDBACK LOOP AND TIME-OF-FLIGHT SENSOR

(71) Applicant: Cognex Corporation, Natick, MA (US)

(72) Inventors: Andreas Weber, Aachen (DE);
Laurens Nunnink, Simpleveld (NL);
Rene Delasauce, Aachen (DE);
William Equitz, Brookline, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/892,943

(22) Filed: Aug. 22, 2022

(65) Prior Publication Data
US 2023/0194710 A1    Jun. 22, 2023

Related U.S. Application Data

(60) Continuation of application No. 16/859,852, filed on Apr. 27, 2020, now Pat. No. 11,422,257, which is a
(Continued)

(51) Int. Cl.
*G01S 17/10* (2020.01)
*G01S 7/486* (2020.01)
(Continued)

(52) U.S. Cl.
CPC .............. *G01S 17/10* (2013.01); *G01S 7/486* (2013.01); *G01S 17/36* (2013.01); *G01S 17/86* (2020.01);
(Continued)

(58) Field of Classification Search
CPC .......... G01S 17/10; G01S 7/486; G01S 17/36; G01S 17/86; G02B 7/04; G02B 7/08;
(Continued)

(56) References Cited

U.S. PATENT DOCUMENTS

| 5,424,772 A | * | 6/1995 | Aoki | H04N 1/2112 386/E5.009 |
| 5,973,852 A | | 10/1999 | Task | |

(Continued)

FOREIGN PATENT DOCUMENTS

| CN | 102564338 A | 7/2012 |
| CN | 104315995 A | 1/2015 |

(Continued)

OTHER PUBLICATIONS

Lin et al., "A High Precision Focal System Design", Journal of Changchun University of Science and Technology (Natural Science Edition) vol. 33, No. 4, Dec. 2020.

*Primary Examiner* — James C. Jones
(74) *Attorney, Agent, or Firm* — Loginov & Associates, PLLC; William A. Loginov

(57) ABSTRACT

This invention provides an integrated time-of-flight sensor that delivers distance information to a processor associated with the camera assembly and vison system. The distance is processed with the above-described feedback control, to auto-focus the camera assembly's variable lens during runtime operation based on the particular size/shape object(s) within the field of view. The shortest measured distance is used to set the focus distance of the lens. To correct for calibration or drift errors, a further image-based focus optimization can occur around the measured distance and/or based on the measured temperature. The distance information generated by the time-of-flight sensor can be employed to perform other functions. Other functions include self-triggering of image acquisition, object size dimensioning, detection and analysis of object defects and/or gap detection between objects in the field of view and software-controlled range detection to prevent unintentional reading of (e.g.) IDs on objects outside a defined range (presentation mode).

20 Claims, 16 Drawing Sheets

Related U.S. Application Data division of application No. 15/857,733, filed on Dec. 29, 2017, now Pat. No. 11,002,854, which is a continuation-in-part of application No. 13/800,055, filed on Mar. 13, 2013, now Pat. No. 10,712,529.

(51) Int. Cl.

| | | |
|---|---|---|
| *G02B 7/04* | (2021.01) | |
| *G01S 17/36* | (2006.01) | |
| *G02B 7/08* | (2021.01) | |
| *G02B 7/40* | (2021.01) | |
| *G01S 17/86* | (2020.01) | |
| *H04N 23/54* | (2023.01) | |
| *H04N 23/55* | (2023.01) | |
| *H04N 23/67* | (2023.01) | |

(52) U.S. Cl.
CPC .............. *G02B 7/04* (2013.01); *G02B 7/08* (2013.01); *G02B 7/40* (2013.01); *H04N 23/54* (2023.01); *H04N 23/55* (2023.01); *H04N 23/67* (2023.01); *H04N 23/671* (2023.01)

(58) Field of Classification Search
CPC .......... G02B 7/40; H04N 23/54; H04N 23/55; H04N 23/67; H04N 23/671
See application file for complete search history.

(56) References Cited

U.S. PATENT DOCUMENTS

| | | | |
|---|---|---|---|
| 6,081,388 A | 6/2000 | Widl | |
| 6,188,526 B1 | 2/2001 | Sasaya | |
| 6,344,930 B1 | 2/2002 | Kaneko | |
| 6,898,021 B1 | 5/2005 | Tang | |
| 7,296,746 B2 | 11/2007 | Philyaw | |
| 7,382,545 B2 | 6/2008 | Jung | |
| 7,436,587 B2 | 10/2008 | Feldman | |
| 7,453,646 B2 | 11/2008 | Lo | |
| 7,466,493 B2 | 12/2008 | Kim | |
| 7,490,576 B2 | 2/2009 | Metcalfe | |
| 7,710,535 B2 | 5/2010 | Nomura | |
| 7,742,075 B2 | 6/2010 | Kimura | |
| 7,755,841 B2 | 7/2010 | Christenson | |
| 7,855,838 B2 | 12/2010 | Jannard | |
| 8,027,095 B2 | 9/2011 | Havens | |
| 8,035,624 B2 | 10/2011 | Bell | |
| 8,072,689 B2 | 12/2011 | Bolis | |
| 8,154,805 B2 | 4/2012 | Jannard | |
| 8,169,709 B2 | 5/2012 | Jannard | |
| 8,203,628 B2 | 6/2012 | Honjo | |
| 8,284,275 B2 | 10/2012 | Abe | |
| 8,363,149 B2 | 1/2013 | Yumiki | |
| 8,381,976 B2 | 2/2013 | Mohideen | |
| 8,405,680 B1 | 3/2013 | Cardoso Lopes | |
| 8,472,122 B2 | 6/2013 | Obu | |
| 8,545,555 B2 | 10/2013 | Berge | |
| 8,548,270 B2 | 10/2013 | Katz | |
| 8,576,390 B1 | 11/2013 | Nunnink | |
| 8,794,521 B2 | 8/2014 | Joussen | |
| 8,983,233 B2 | 3/2015 | Katz | |
| 9,270,974 B2 | 2/2016 | Zhang | |
| 9,760,837 B1 | 9/2017 | Nowozin | |
| 9,805,454 B2 | 10/2017 | Hudman | |
| 10,712,529 B2 | 7/2020 | Nunnink | |
| 2001/0050758 A1 | 12/2001 | Suzuki | |
| 2003/0095238 A1 | 5/2003 | Imafuku | |
| 2004/0228003 A1 | 11/2004 | Takeyama | |
| 2005/0058337 A1 | 3/2005 | Fujimura | |
| 2006/0047039 A1 | 3/2006 | Kato | |
| 2006/0257142 A1 | 11/2006 | Tanaka | |
| 2007/0170259 A1 | 7/2007 | Nunnink | |
| 2007/0216851 A1 | 9/2007 | Matsumoto | |
| 2008/0055425 A1 | 3/2008 | Kuiper | |
| 2008/0062529 A1 | 3/2008 | Helwegen | |
| 2008/0231966 A1 | 9/2008 | Hendriks | |
| 2008/0273760 A1 | 11/2008 | Metcalfe | |
| 2008/0277477 A1 | 11/2008 | Thuries | |
| 2008/0277480 A1 | 11/2008 | Thuries | |
| 2009/0072037 A1 | 3/2009 | Good | |
| 2009/0141365 A1 | 6/2009 | Jannard | |
| 2009/0162601 A1 | 6/2009 | Dickover | |
| 2009/0302197 A1 | 12/2009 | Uchino | |
| 2010/0039709 A1 | 2/2010 | Lo | |
| 2010/0231783 A1 | 9/2010 | Bueeler | |
| 2010/0243862 A1 | 9/2010 | Nunnink | |
| 2010/0276493 A1 | 11/2010 | Havens | |
| 2010/0322612 A1 | 12/2010 | Tsuda | |
| 2011/0158634 A1 | 6/2011 | Craen | |
| 2011/0176221 A1 | 7/2011 | Tanaka | |
| 2011/0205340 A1 | 8/2011 | Garcia | |
| 2011/0229840 A1 | 9/2011 | Liang | |
| 2011/0274372 A1 | 11/2011 | Bianchi | |
| 2012/0037705 A1 | 2/2012 | Mohideen | |
| 2012/0062725 A1 | 3/2012 | Wampler, II | |
| 2012/0092485 A1 | 4/2012 | Meinherz | |
| 2012/0105707 A1 | 5/2012 | Futami | |
| 2012/0143004 A1 | 6/2012 | Gupta | |
| 2012/0160918 A1 | 6/2012 | Negro | |
| 2012/0200764 A1 | 8/2012 | Afshari | |
| 2012/0261474 A1 | 10/2012 | Kawashime | |
| 2012/0261551 A1 | 10/2012 | Rogers | |
| 2012/0281295 A1 | 11/2012 | Jannard | |
| 2013/0021087 A1 | 1/2013 | Rosset | |
| 2014/0183264 A1 | 7/2014 | Nunnink | |
| 2014/0268361 A1 | 9/2014 | Nunnink | |
| 2015/0260830 A1 | 9/2015 | Ghosh | |
| 2016/0127715 A1 | 5/2016 | Shotton | |
| 2016/0292522 A1 | 10/2016 | Chen | |
| 2016/0306046 A1 | 10/2016 | Axelsson | |
| 2016/0375524 A1 | 12/2016 | Hsu | |

FOREIGN PATENT DOCUMENTS

| | | |
|---|---|---|
| CN | 105807285 A | 7/2016 |
| CN | 105827933 A | 8/2016 |
| CN | 107454311 A | 12/2017 |
| EP | 1583354 | 10/2005 |
| EP | 1837689 A1 | 9/2007 |
| EP | 2034338 | 3/2009 |
| JP | H0527165 | 2/1993 |
| JP | 2004029685 A | 1/2004 |
| JP | 2006520007 A | 8/2006 |
| JP | 2009505543 A | 2/2009 |
| JP | 2011218156 A | 11/2011 |
| WO | 2004083899 A2 | 9/2004 |
| WO | 2007020451 A2 | 2/2007 |

* cited by examiner

LENS ASSEMBLY WITH INTEGRATED FEEDBACK LOOP AND TIME-OF-FLIGHT SENSOR

RELATED APPLICATION

This application is continuation of co-pending U.S. patent application Ser. No. 16/859,852, entitled LENS ASSEMBLY WITH INTEGRATED FEEDBACK LOOP AND TIME-OF-FLIGHT SENSOR, filed Apr. 27, 2020, which is a divisional of U.S. patent application Ser. No. 15/857,733, entitled LENS ASSEMBLY WITH INTEGRATED FEEDBACK LOOP AND TIME-OF-FLIGHT SENSOR, filed Dec. 29, 2017, now U.S. Pat. No. 11,002,854, issued May 11, 2021, which is a continuation-in-part of U.S. patent application Ser. No. 13/800,055, entitled LENS ASSEMBLY WITH INTEGRATED FEEDBACK LOOP FOR FOCUS ADJUSTMENT, filed Mar. 13, 2013, now U.S. Pat. No. 10,712,529, issued Jul. 14, 2020, the teachings of each of which applications are expressly incorporated herein by reference.

FIELD OF THE INVENTION

This application relates to cameras used in machine vision and more particularly to automatic focusing lens assemblies and range finders in cameras.

BACKGROUND OF THE INVENTION

Vision systems that perform measurement, inspection, alignment of objects and/or decoding of symbology (e.g. bar codes, or more simply "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader, the user or automated process acquires an image of an object that is believed to contain one or more IDs. The image is processed to identify ID features, which are then decoded by a decoding process and/or processor to obtain the inherent information (e.g. alphanumeric data) that is encoded in the pattern of the ID.

Often, a vision system camera includes an internal processor and other components that allow it to act as a standalone unit, providing a desired output data (e.g. decoded symbol information) to a downstream process, such as an inventory tracking computer system or logistics application. It is often desirable that the camera assembly contain a lens mount, such as the commonly used C-mount, that is capable of receiving a variety of lens configurations. In this manner, the camera assembly can be adapted to the specific vision system task. The choice of lens configuration can be driven by a variety of factors, such as lighting/illumination, field of view, focal distance, relative angle of the camera axis and imaged surface, and the fineness of details on the imaged surface. In addition, the cost of the lens and/or the available space for mounting the vision system can also drive the choice of lens.

An exemplary lens configuration that can be desirable in certain vision system applications is the automatic focusing (auto-focus) assembly. By way of example, an auto-focus lens can be facilitated by a so-called liquid lens assembly. One form of liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other auto-focus mechanisms, the liquid lens has extremely fast response times. It is also ideal for applications with reading distances that change from object-to-object (surface-to-surface) or during the changeover from the reading of one object to another object—for example in scanning a moving conveyor containing differing sized/height objects (such as shipping boxes). In general, the ability to quickly focus "on the fly" is desirable in many vision system applications.

A recent development in liquid lens technology is available from Optotune AG of Switzerland. This lens utilizes a movable membrane covering a liquid reservoir to vary its focal distance. A bobbin exerts pressure to alter the shape of the membrane and thereby vary the lens focus. The bobbin is moved by varying the input current within a preset range. Differing current levels provide differing focal distances for the liquid lens. This lens can provide a larger aperture for use in various applications. However, due to thermal drift and other factors, there may be variation in calibration and focus setting during runtime use, and over time in general. A variety of systems can be provided to compensate and/or correct for focus variation and other factors. However, these can require processing time (within the camera's internal processor) that slows the lens' overall response time in coming to a new focus. It is recognized generally that a control frequency of at least approximately 1000 Hz may be required to adequately control the focus of the lens and maintain it within desired ranges. This poses a burden to the vision system's processor, which can be based on a DSP or similar architecture. That is vision system tasks would suffer if the DSP were continually preoccupied with lens-control tasks.

Additionally, in many vision system applications, such as ID-decoding in logistics operations (e.g. tracking IDs on packages as they pass down a conveyor line), the height, length, overall size and spacing gap between objects is highly variable. This presents challenges for the vision system. Various techniques allow for 3D imaging, but they may not be cost-effective or suitable for a logistics (or similar) environment where a main goal is detecting presence of a surface containing an ID and acquiring a decodable image of the ID as rapidly and efficiently as possible. Moreover, ID readers can also be configured in a so-called presentation mode, in which the reader is fixedly mounted and typically directed to image a scene downwardly. In operation, a user locates an ID a code, typically located at the top surface of an object, within the reading range of the reader (i.e. presenting the ID to the reader). In such application the reading range should be clearly defined, but not too large, so as to prevent unintentional reading of the code at times not desired by the user (and only when deliberately presented).

SUMMARY OF THE INVENTION

This invention overcomes disadvantages of the prior art by providing a removably mountable lens assembly for a vision system camera that includes an integral auto-focusing, liquid lens unit, in which the lens unit compensates for focus variations by employing a feedback control circuit that is integrated into the body of the lens assembly. The feedback control circuit receives motion information related to and actuator, such as a bobbin (which variably biases the membrane under current control) of the lens from a position sensor (e.g. a Hall sensor) and uses this information internally to correct for motion variations that deviate from the lens setting position at a target lens focal distance setting. The defined "position sensor" can be a single (e.g. Hall sensor) unit or a combination of discrete sensors located variously with respect to the actuator/bobbin to measure movement at various locations around the lens unit. Illustratively, the feedback circuit can be interconnected with one or more temperature sensors that adjust the lens setting position for a particular temperature value. In addition, the feedback circuit can communicate with an accelerometer that senses the acting direction of gravity, and thereby corrects for potential sag (or other orientation-induced deformation) in the lens membrane based upon the spatial orientation of the lens.

This invention further provides an integrated (e.g. inexpensive and commercially available) single-point or multi-point time-of-flight sensor that delivers distance information to a processor associated with the camera assembly and vison system. This distance information is processed, illustratively, in conjunction with the above-described feedback control, to auto-focus the camera assembly's variable (e.g. liquid) lens during runtime operation based on the particular size/shape object(s) within the field of view. Illustratively, the shortest measured distance is used to set the focus distance of the lens. To correct for calibration or drift errors, a further image-based focus optimization can occur around the measured distance and/or based on the measured temperature. The distance information generated by the time-of-flight sensor can also be employed to perform other functions. Another function is self-triggering of image acquisition of an object by the vision system. That is, when a change in object distance is measured (for example, the change between a positive height and the supporting base/conveyor height), an image capture is triggered. This function can be used to trigger acquisition in either presentation mode in which an object is passed into the camera's field of view, or in conveyor belt applications in which objects pass through the camera field of view along a particular travel direction. Another function is object (e.g. box) size dimensioning in which a vision system with a time-of-flight sensor is mounted above the supporting/measurement base (for example, a conveyor belt). During calibration, the height between measurement base and vision system is measured and stored in the system. At runtime, the vision system captures images and measures the distance to the object in the center of the image. If a (e.g.) rectangular shape is detected which includes the center of the image, the dimensions of that rectangle are determined based on the measured distance and the known optical properties of imager (sensor size, focal length). The height of the exemplary box is the difference between the height of the camera and measured shortest distance between camera and box.

Another possible function is the detection and analysis of object defects. After a detection of the rectangular top surface as described above, deviations from the rectangular shape are measured and damaged objects (e.g. boxes) can be detected. Yet another possible function is region of interest (RoI) detection. The field of view of a camera-based ID reader is also imaged onto the sensed area of a multi-point (i.e. n×1 or n×m, time-of-flight points/pixels) sensor array. The measured 3D height map generated by the sensor array can be used to narrow the region of interest for ID decoding. That is, knowing in which part of the image the object resides reduces decoding time as ID candidate features are searched from a narrowed region of interest in the overall acquired image.

Another possible function is gap detection between objects in the field of view, which assists in linking the appropriate ID code to the appropriate imaged object (box). In logistics applications, where there is more than one box in residing within field of view at the same time, the time-of-flight measurement can assist in locating the edge(s) of the object and to determine what ID is actually associated therewith.

Yet another possible function of the vision system arrangement herein is, employ the distance measured received from the time-of-flight sensor to limit the reading range of the vision system so as to prevent unintentional reading. This can be part of a so-called presentation mode functionality within the vision system. By way of example, only if the distance to the object is within a defined range, then (e.g.) the ID reader (a) captures an image, (b) initiates an ID-de decoding process, and/or (c) transmits the decoded data to the host system. If the distance to the ID code (as indicated by the time-of-flight sensor is outside this range, then at least one of the above steps (a)-(c) in the overall ID-reading process can be disabled so a result is not generated or stored for downstream use in a task, etc.

In an illustrative embodiment, an image-based ID code reader is provided. The reader comprises a vision system camera with an image sensor and optics and a vision system processor, which is arranged to find and decode IDs in acquired images of the vision system camera. A time-of-flight sensor is integrated with the vison system camera, which reads distance with respect an object in a field of view of the vision system camera. The time-of-flight sensor is operatively connected with at least one of the vision system processor and a camera control. In embodiments, a change in read object distance can trigger at least one of image acquisition by the vision system camera and an ID decoding process by the vision system processor. Illustratively, the change in distance comprises a reduced distance from a baseline distance derived from a support or conveyor for the object. The time-of-flight sensor can be a single-point time-of-flight sensor or a multi-point time-of-flight sensor. In an exemplary embodiment, in which the reader operates in so-called presentation mode, at least one of (a) the image acquisition (b) the ID decoding process, and (c) delivery of results from the ID decoding process (which can be performed by the image sensor, processor and/or a camera control) is/are enabled exclusively if the object is within a predetermined distance range.

In another illustrative embodiment, a vision system is provided, which includes a 2D image sensor and an imager lens that projects received light from a scene onto the image sensor. The imager lens includes a variable lens with an electrically controllable focus distance. A time-of-flight sensor receives a distance measurement from the scene, and a temperature sensor generates a temperature measurement with respect to an ambient environment of the imager lens. A variable lens control circuit is also arranged to set the focus distance of the variable lens based on the distance measurement and the temperature measurement. Illustratively, the time-of-flight sensor is a single-point time-of-flight sensor, and/or the variable lens assembly comprises a membrane-based liquid lens assembly.

In another illustrative embodiment, a vision system is provided, which includes a 2D image sensor that acquires images of a scene, an imager lens that projects received light from the scene onto the image sensor, and a time-of-flight sensor that a receives a distance measurement from the scene. A processor is arranged to receive distance data from the time-of-flight sensor. Based upon the distance data the processor determines one or more height measurements with respect to one or more objects within the scene, so as to perform an analysis process on the one or more objects. Illustratively, the one or more objects define a rectilinear shape and the analysis process defines measuring dimensions of the one or more objects by (a) measuring a distance between the image sensor and the object in the center of the image; (b) searching for a rectangular shape in the center of an image acquired by the image sensor with one or more vision system tools, (c) computing dimensions of a top surface of the one or more objects relative to the rectangular shape, based on the measured distance and known optical properties of image sensor and imager lens, and (d) calculating a height of the one or more objects, based on a measured shortest distance between the image sensor and the top surface and a known height position of the image sensor based upon a reference surface. The reference surface can comprise a moving conveyor (or other relatively flat/planar moving or stationary stage) that passes the one or more objects through the scene. The processor can be arranged to determine deviations from the rectilinear shape to determine a defect in the one or more objects. Also, the one or more objects can be in relative motion with respect to the image sensor and the time-of-flight sensor. The image sensor and the imager lens can be mounted so as to acquire images of the one or more objects as they are transported on a conveyor through a scene. The sensor and lens are operatively connected to an ID decoder that finds and decodes ID information on the one or more objects. The time-of-flight sensor can be a single-point time-of-flight sensor or a multi-point time-of-flight sensor. Illustratively, the processor receives a plurality of height values concurrently from the multi-point time-of-flight sensor relative to discrete parts of the scene, and based on the measured height values defines at least one region of interest with respect to the one or more objects. An ID decoder can receive image data from the scene, and locate and decode ID information within at least one region of interest. Additionally, the ID decoder can receive image data from the scene and locate and decode ID information from the image data. The processor is arranged to detect a plurality of objects based on the height values in the scene and to associate one or more located IDs relative to each of the plurality of objects, respectively. The imager lens can also define a removable lens assembly that includes an electrically controlled variable lens and a lens controller circuit operatively connected to the variable lens. As such, the lens controller circuit can be housed in the removable lens assembly. In embodiments, the time-of-flight sensor can also be contained integrally within the removable lens assembly and interconnected to the lens controller circuit.

BRIEF DESCRIPTION OF THE DRAWINGS

The invention description below refers to the accompanying drawings, of which.

DETAILED DESCRIPTION

I. Vision System Camera Lens

Figure 1:
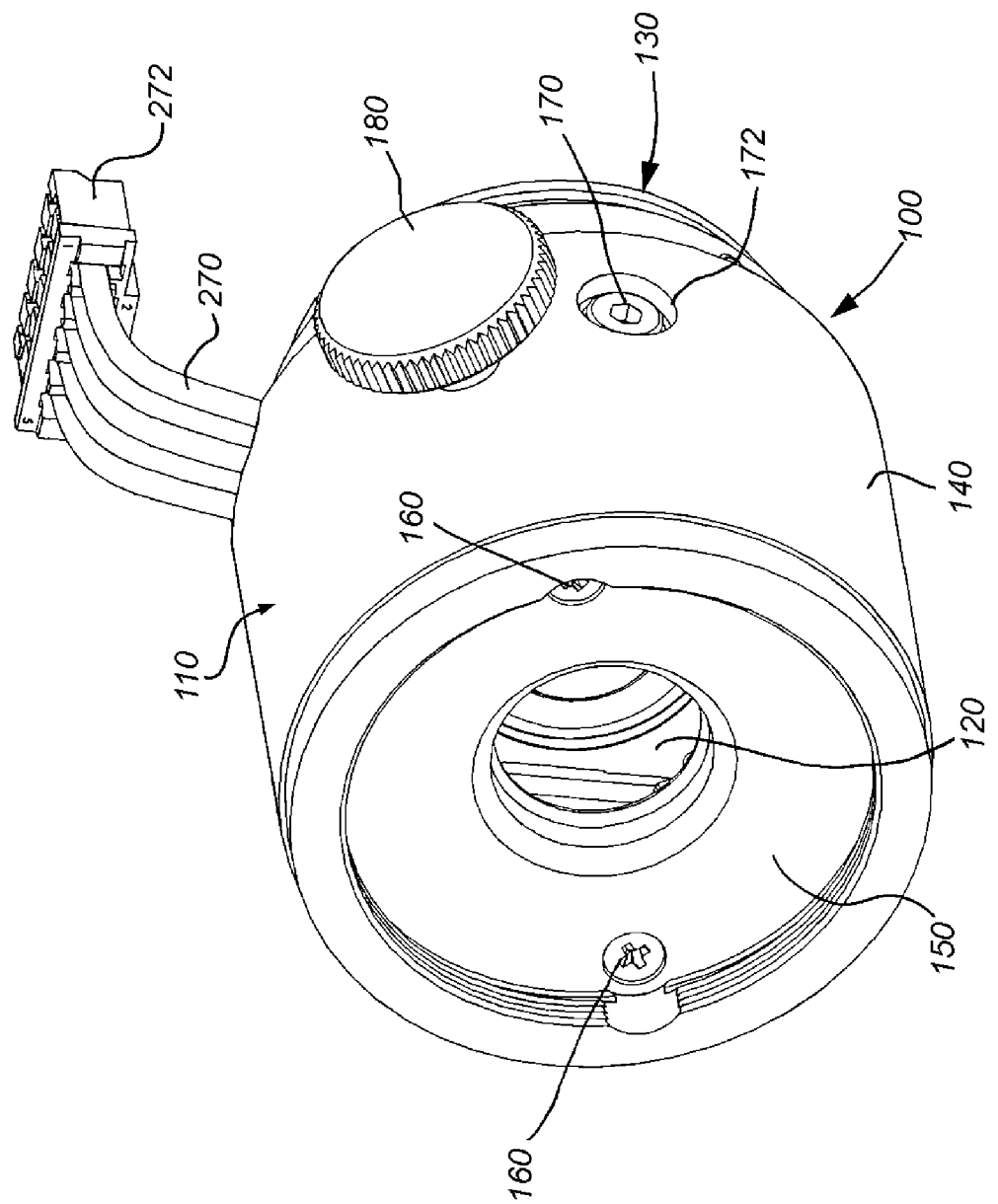
FIG. 1 is a perspective view of the external structure of an exchangeable auto-focus lens assembly with integrated feedback-loop-based focus control according to an illustrative embodiment.

FIG. 1 details the external structure of an exchangeable, auto-focus lens assembly (also simply termed "lens assembly") 100 according to an illustrative embodiment. The lens assembly includes an outer cap 110 defining a generally cylindrical shape. This outer cap 110 provides a protective and supporting shell for a variable focus lens element (comprising an Optotune membrane-based liquid lens model EL-6-18 or EL-10-30 in this exemplary embodiment) 120. By way of useful background information the present data sheet with specifications for various models of this lens is available on the World Wide Web at www.optotune.com/images/products/Optotune%20EL-6-18.pdf. It is expressly contemplated that the teachings of the embodiments herein can be applied to a variety of electronically focused lens types including other forms of liquid lens technology and electro-mechanically adjusted solid lenses. For the purposes of this description, the variable focus lens element 120 (also simply termed the "liquid lens") of the overall auto-focus lens assembly 100 is assumed to operate based upon predetermined inputs of current (or voltage in alternate arrangements), and provides various outputs that the user can employ to monitor and control the lens using conventional techniques. Such outputs can include the position of the bobbin using, for example, one or more Hall sensors (described further below) and/or the present temperature of the lens using one or more conventional temperature sensors.

By way of further background, it has been observed that such liquid lenses exhibit excessive drift of its optical power over time and temperature. Although the lens can be focused relatively quickly to a new focal position (i.e. within 5 milliseconds), it tends to drift from this focus almost immediately. The initial drift (or "lag") is caused by latency in the stretch of the membrane from one focus state to the next—i.e. the stretch takes a certain amount of time to occur. A second drift effect with a longer time constant is caused by the power dissipation of the lens' actuator bobbin heating up the lens membrane and liquid. In addition the orientation of the lens with respect to the acting direction of gravity can cause membrane sag that has an effect on focus. The system and method of the embodiments described herein address disadvantages observed in the operation and performance such liquid lenses.

The rear 130 of the lens assembly 100 includes a threaded base that can be adapted to seat in a standard camera mount, such as the popular cine or (C-mount). While not shown, it is expressly contemplated that the lens assembly 100 can be (removably) mounted a variety of camera types adapted to perform vision system tasks with an associated vision system processor.

Figure 2:
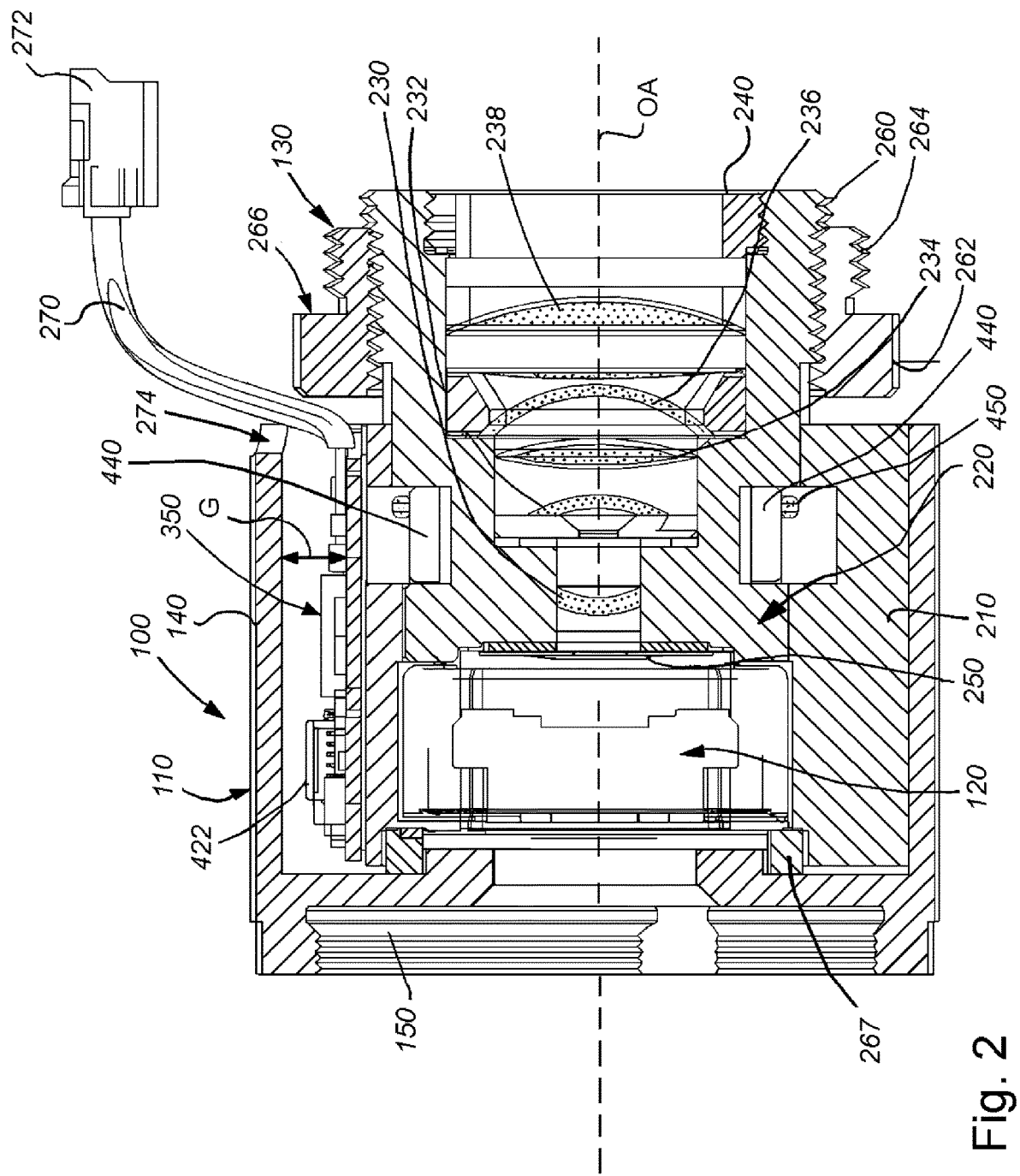
FIG. 2 is a side cross section of the lens assembly of FIG. 1 showing the layout of internal mechanical, optical, electro-optical and electronic components.
Figure 3:
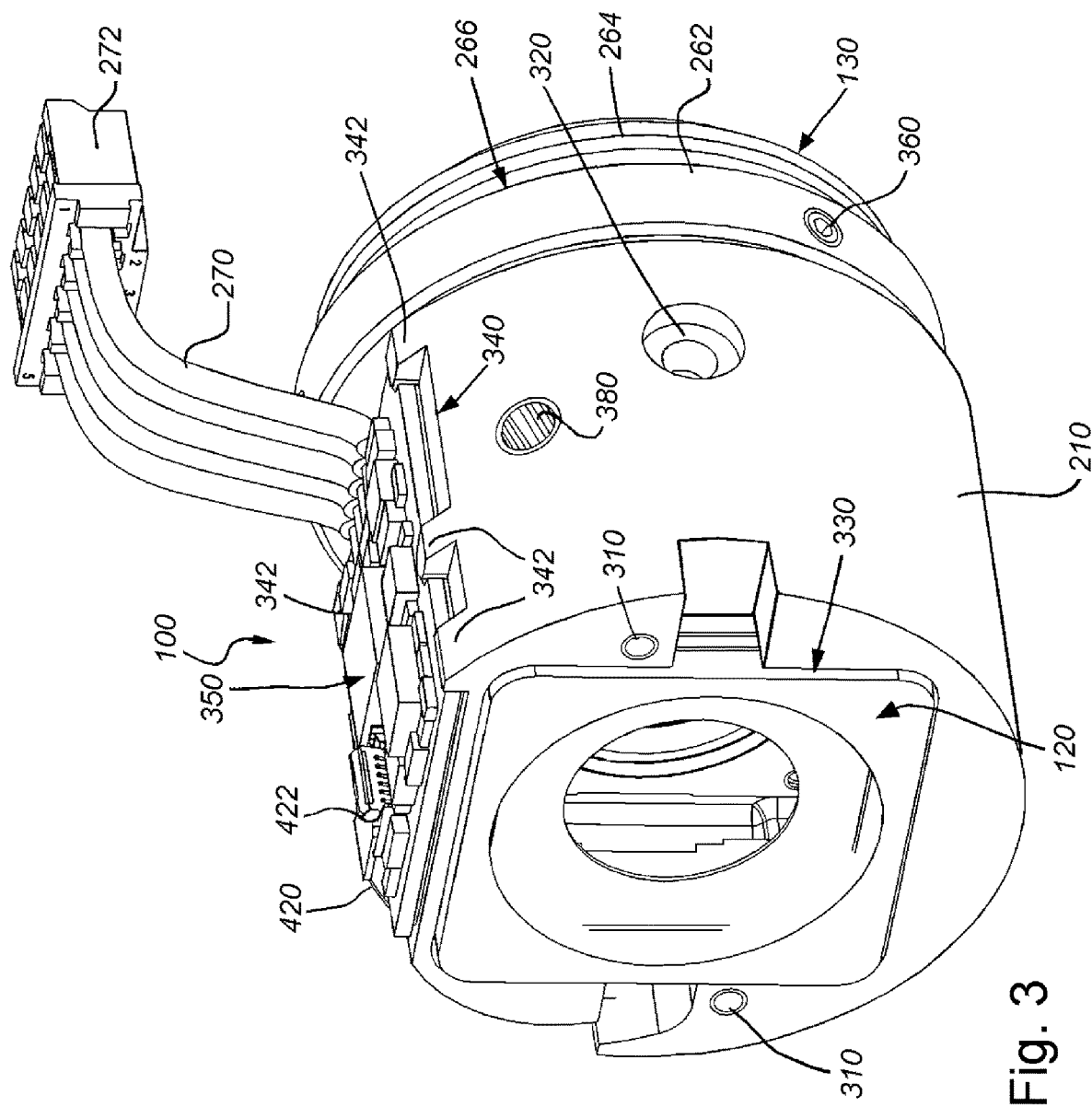
FIG. 3 is a perspective view of the lens assembly of FIG. 1 with outer cap removed to reveal the arrangement of components.
Figure 4:
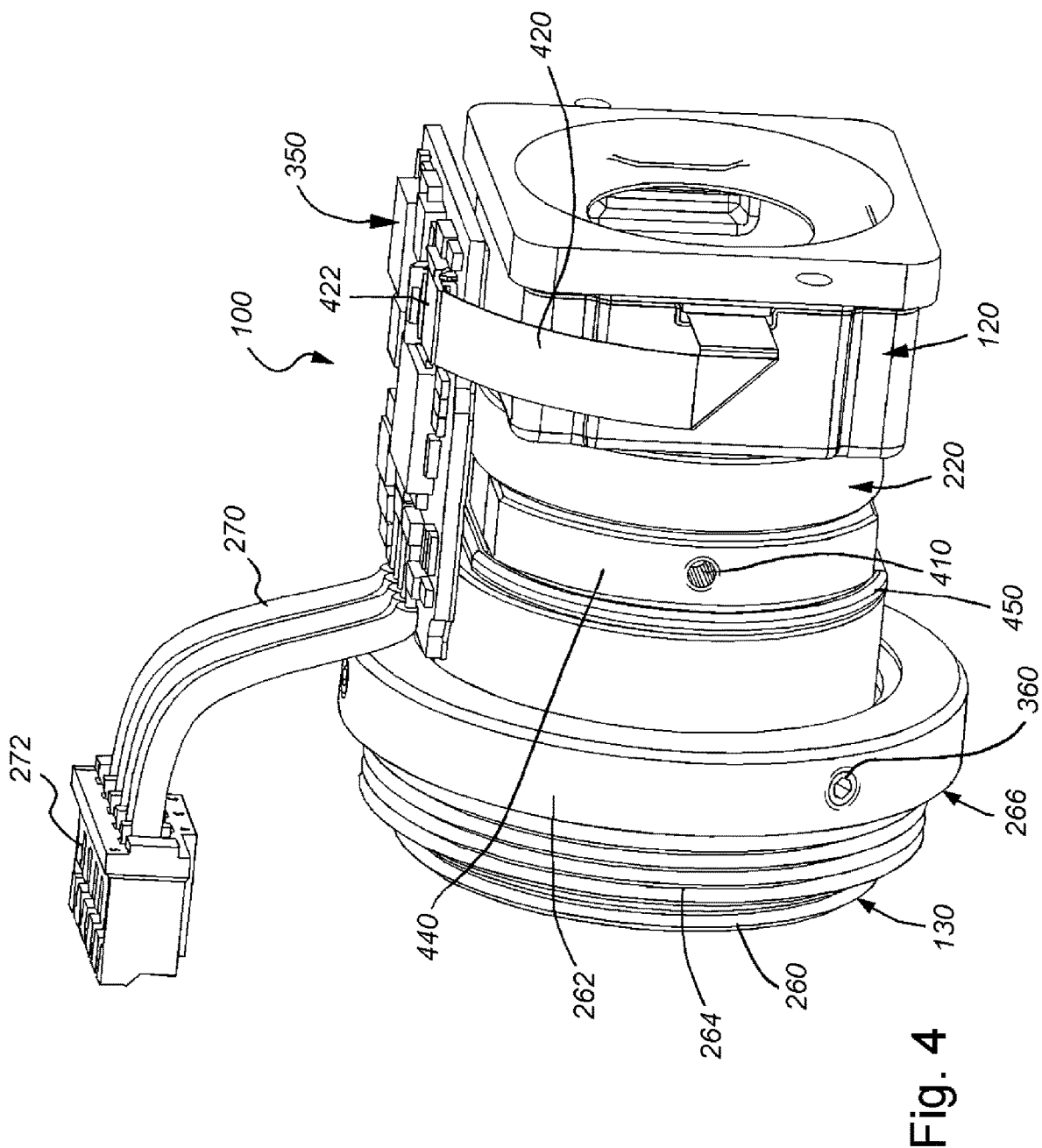
FIG. 4 is a perspective view of the lens assembly of FIG. 1 with the outer cap and spacer assembly removed to reveal the interconnection between the liquid lens and the control circuit.

With further reference also to FIGS. 2-4, the construction of the lens assembly 100 is described in further detail. It is expressly contemplated that the depicted construction is illustrative of a range of possible arrangements of components that should be clear to those of skill in the art. The cap 110 defines a metal shell (for example aluminum alloy) that includes a side skirt 140 and unitary front face 150. The cap overlies a spacer/filler 210 (see also FIG. 3). This filler 210 includes a pair of threaded holes 310 (FIG. 3) that receive threaded fasteners 160 to removably secure the cap over the filler 210. A pair of opposing threaded fasteners 170 are recessed in corresponding holes 172 of the cap and pass through holes 320 in the filler 210 and into threaded holes 410 (FIG. 4) on two keys 440 that rotatably engage the main lens barrel assembly 220 (FIGS. 2 and 4). This relationship is described further below. These fasteners 170 maintain the main lens barrel assembly 220 in axial alignment with the filler 210.

As shown in FIG. 2, the lens barrel assembly 220 contains a series of fixed lenses 230, 232, 234, 236 and 238 arranged according to ordinary optical skill behind the liquid lens 210. These lenses allow the image projected along the optical axis OA to the vision system sensor to be sized appropriately to the sensor's area over a range of varying focal distances specified for the lens assembly. By way of example, the range of optical power can be −2 to +10 diopter. The lenses 230-238 are arranged in a compressed stack within the main barrel assembly 220 with appropriate steps and/or spacers therebetween. The overall stack is held in place by a threaded retaining ring 240 at the rear end (130) of the lens assembly 110. At the front of the main barrel is located an aperture stop disc 250 that reduces the system aperture to an appropriate, smaller diameter. This allows customization of brightness/exposure control and/or depth of field for a given vision system application.

The main barrel assembly 220 includes a rear externally threaded base 260 having a diameter and thread smaller than that of a C-mount—for example a conventional M-12 mount size for interchangeability with camera's employing this standard, or another arbitrary thread size. A threaded mount ring 262 with, for example, a C-mount external thread 264 is threaded over the base thread 260. This ring 262 allows the back focus of the lens with respect to the camera sensor to be accurately set. In general, the shoulder 266 of the ring is set to abut the face of the camera mount when the lens is secured against the camera body. A pair of set screws 360 (FIGS. 3 and 4) pass through the ring 262, and removably engage the base thread 260 to maintain the mount ring 262 at an appropriate back focus setting.

An O-ring 267 is provided on the front face of the liquid lens 120 to cancel out tolerances. In addition, and with reference also to FIG. 4, filler 210 is adapted to rotate with respect to the main barrel assembly 220. A pair of semi-circular keys 440, held together by an O-ring 450 engage a groove in the filler 210 and allow the filler 210 and cap 110 to rotate with respect to the barrel assembly 220 about the axis OA, while fixing these components along the axial direction. In this manner, after the lens assembly threaded base is properly seated in the camera housing with desired back focus, the cap is rotated to align the cable 270 with the camera's connecting socket. This rotation is secured via the knob 180 (FIG. 1) that threads through a hole 380 in the filler 210 and can be tightened to bear against the barrel assembly 220, thereby rotationally locking these components together at the desired rotational orientation therebetween.

As shown in FIG. 3, the front end of the filler 210 includes a somewhat rectangular recess 330 to support the shape of the liquid lens 120 in a position at the front of the assembly and in front of the main barrel assembly 220. The filler 210 also includes a flattened top end (shelf) 340 with appropriate raised retaining tabs 342 to support a lens control circuit board 350 according to an illustrative embodiment. The arrangement of the shelf 340, circuit board 350 and cap 110 define a sufficient gap G (FIG. 2) between the inner surface of the cap and the circuit board to provide clearance for the board. In an embodiment, the approximate diameter of the cap is approximately 32 millimeters.

Notably, the barrel assembly 220 is an interchangeable component so that different fixed lens arrangements can be provided in the overall lens assembly (i.e. with the same liquid lens, cap and control circuitry). Thus, this design provides substantial versatility in providing a range of possible focal distances for different vision system applications.

Also notably, the provision of a lens control circuit within the overall structure of the lens assembly allows certain control functions to be localized within the lens itself. This is described in further detail below. The circuit board 350 is connected via a connector 422 and standard ribbon cable 420 to the liquid lens 120 as shown in FIG. 4. The filler 210 provides a gap to run the cable 420 between these components. Additionally, the control circuit board 350 is connected to a cable 270 and multi-pin end connector 272. These are arranged to electrically connect to a receptacle on the camera housing (typically along its front face adjacent to the lens mount). This cable provides power to the lens assembly (the circuit board and liquid lens) from the camera body, and also provides a data interconnect between the lens and the camera's vision system processor, as described in further detail below. A cutout 274 at the rear edge of the cap 110 provides a chase for the cable 270 to pass from the interior to the exterior of the lens assembly 110. Appropriate seals and/or close-tolerance fits prevent incursion of moisture or contaminants from the environment.

II. Lens Feedback Control

Figure 5:
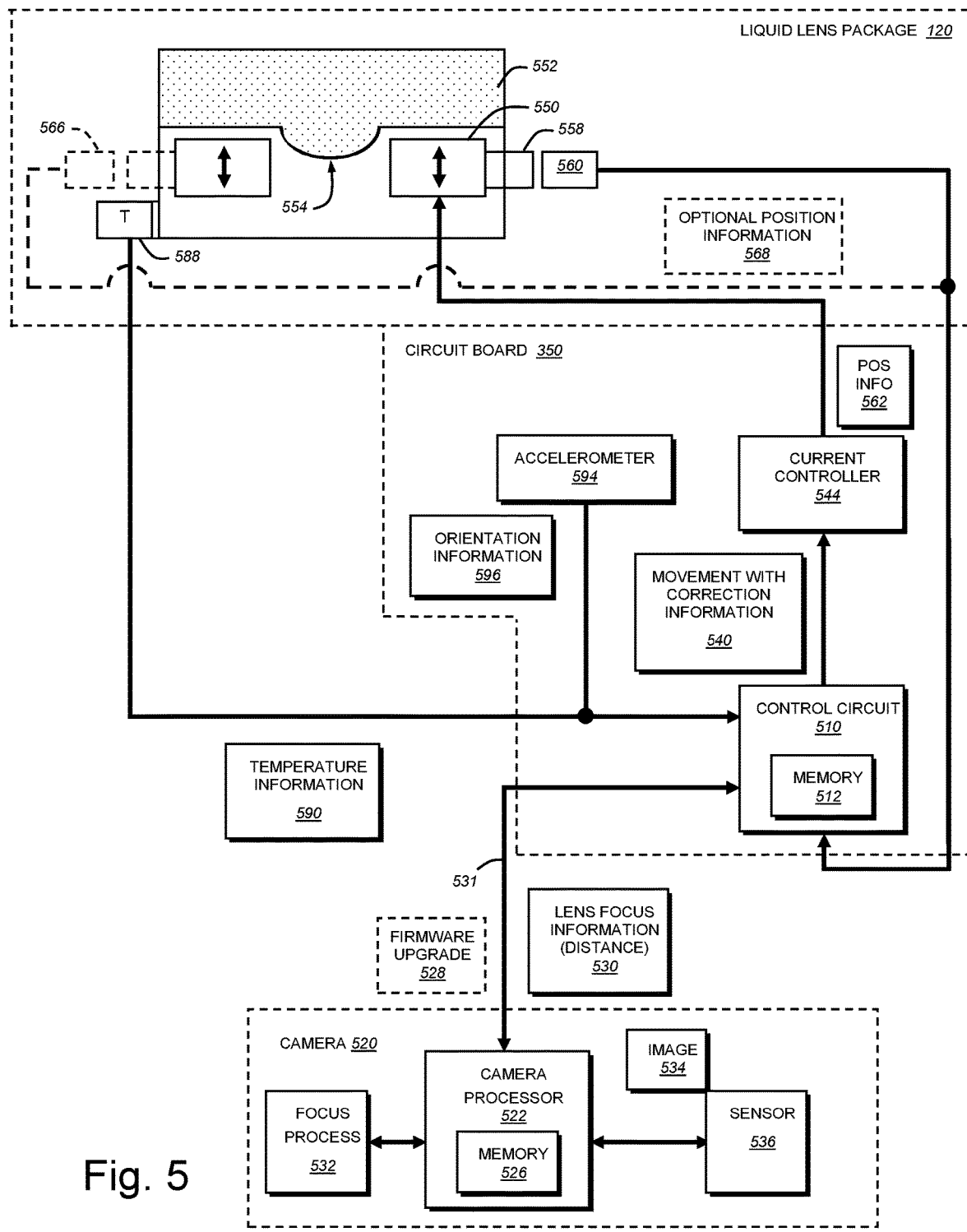
FIG. 5 is a block diagram of the generalized electrical connection and data flow between the liquid lens, integrated controller and camera vision system processor for the lens assembly of FIG. 1.
Figure 6:
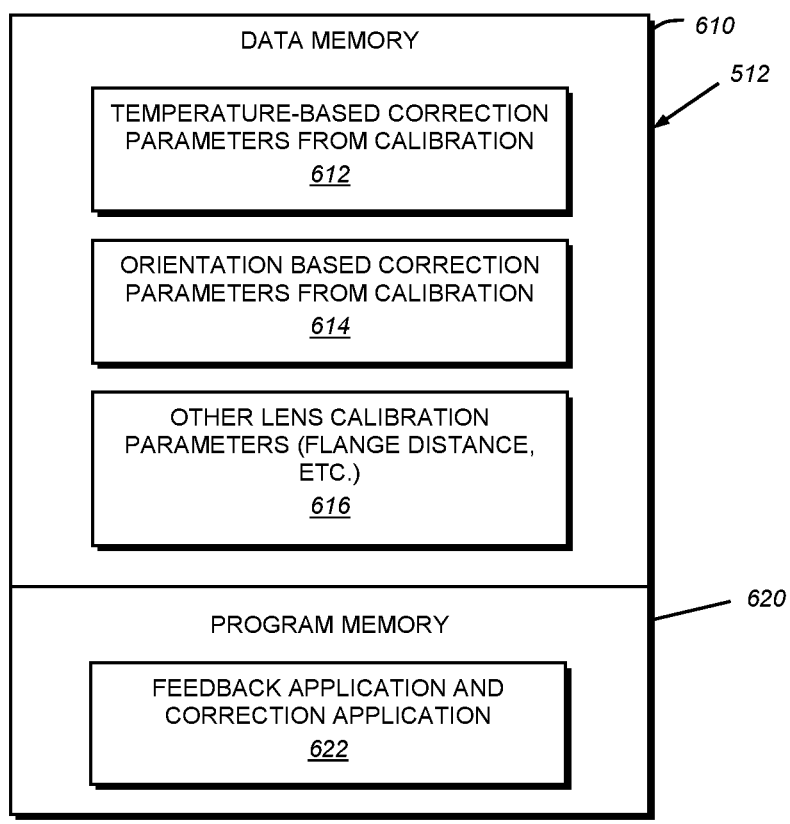
FIG. 6 is a block diagram of the stored data in the control circuit memory of FIG. 5.

The control functions of the circuit board 350 are now described in further detail with reference to FIG. 5. As described above, it has been observed that the drift or lag can be controlled by measuring the position of the actuator and the temperature of the lens and using this data to control the current through the lens actuator bobbin (a magnetic coil that compresses the lens variable under different current settings). In an illustrative embodiment, such drift/lag is compensated by a control circuit 510 (also termed simply "controller") on the circuit board that integrates a (digital) feedback loop completely into the lens barrel of the lens assembly avoiding the use of the camera's vision system processor to control these adjustments. The control circuit includes an associated memory (e.g. an EEPROM) 512 that, as shown in FIG. 6 can be divided into data memory 610 and program memory 620. As described further below, the data memory 610 can include correction parameters for temperature 612, orientation with respect to gravity 614, and other appropriate parameters 616. Such other parameters 616 can include tolerance control parameters, such as the flange tolerance correction (described below). The program memory can include the feedback-loop control software and correction application 622.

At startup, the vision system 520 communicates to the lens assembly circuit 350 the tolerance value of its flange-to-sensor distance. This value is the deviation from the ideal C-mount distance (typically 17.526 millimeters), which has been measured after assembly of the vision system and has been stored in the memory 526 (e.g. a non-volatile flash memory) of the vision system. The control circuit 510 is arranged to correct for the flange tolerance as described further below.

Upon startup, the control circuit 510 can request the vision system processor 522 of the vision system camera 520 to provide the latest firmware upgrade 528 so that the function lens assembly is synchronized with the software and firmware of the vision system. If the firmware is up-to-date, then the processor indicates this state to the lens control circuit and no upgrade is performed. If the firmware is out-of-date, then the new firmware is loaded in the appropriate location of the lens assembly's program memory 620 (FIG. 6). This communication typically occurs over the lens assembly's I2C communication interface (531) transmitted over the cable 270 (FIG. 2).

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

The control circuit 510 can be implemented using a variety of electronic hardware. Illustratively a microcontroller is employed. The control circuit 510 receives focus information 530 (e.g. focal distance, which is translated by the controller into target bobbin position) from the vision system camera 520 (i.e. via cable 270 and interface link 531). This focus information can be derived from a focus process 532 that operates in the camera processor 522. The focus process can use conventional or custom auto-focus techniques to determine proper focus. These can include range-finding or stepping through a series of focus values in an effort to generate crisp edges in the image 534 of an object acquired by the sensor 536. While highly variable a 2K×1K-pixel sensor is used in the exemplary embodiment. Alternatively, the focus process can include data derived from a range-finding sensor, such an integrated time-of-flight sensor as described below.

The focus information 530 is used by the control circuit 510 to generate a target bobbin position and to provide a digital signal with movement information 540 to the current controller 544. The current controller applies the appropriate current to an annular bobbin assembly 550 (or "bobbin"), which thereby deforms the liquid lens membrane 552 to provide an appropriate convex shape to the bulged lensmatic region 554 within the central opening of the bobbin 550. The bobbin 550 includes a magnet 558 that passes over a conventional linear Hall sensor 560. This Hall sensor 560 generates a digital position signal 562 that is directed back to the control circuit 510 where it is analyzed for actual bobbin position (for example, calling up values in the memory 512) versus the target position represented by a corresponding Hall sensor target position. If, in a comparison of the actual Hall sensor value and target Hall sensor value, these values do not match, then the control circuit 510 applies a correction, and that is delivered to the current controller 544, where it is used to move the bobbin 550 to a correct position that conforms with the target Hall sensor position. Once the bobbin 550 is at the correct position, the controller can signal that correction is complete.

Note that additional Hall sensors (or other position-sensing devices) 566 (shown in phantom) can generate additional (optional) position signals 568 that are used by the control circuit to verify and/or supplement the signal of sensor 560. In an embodiment, data is transmitted between components using an I2C protocol, but other protocols are expressly contemplated. In general, the commercially available Hall sensor operates in the digital realm (i.e. using the I2C interface protocol), thereby effectively avoiding signal interference due to magnetic effects. By way of non-limiting example, a model AS5510 Hall linear sensor (or sensors) available from AustriaMicrosystems (AMS) of Austria can be used.

Figure 5A:
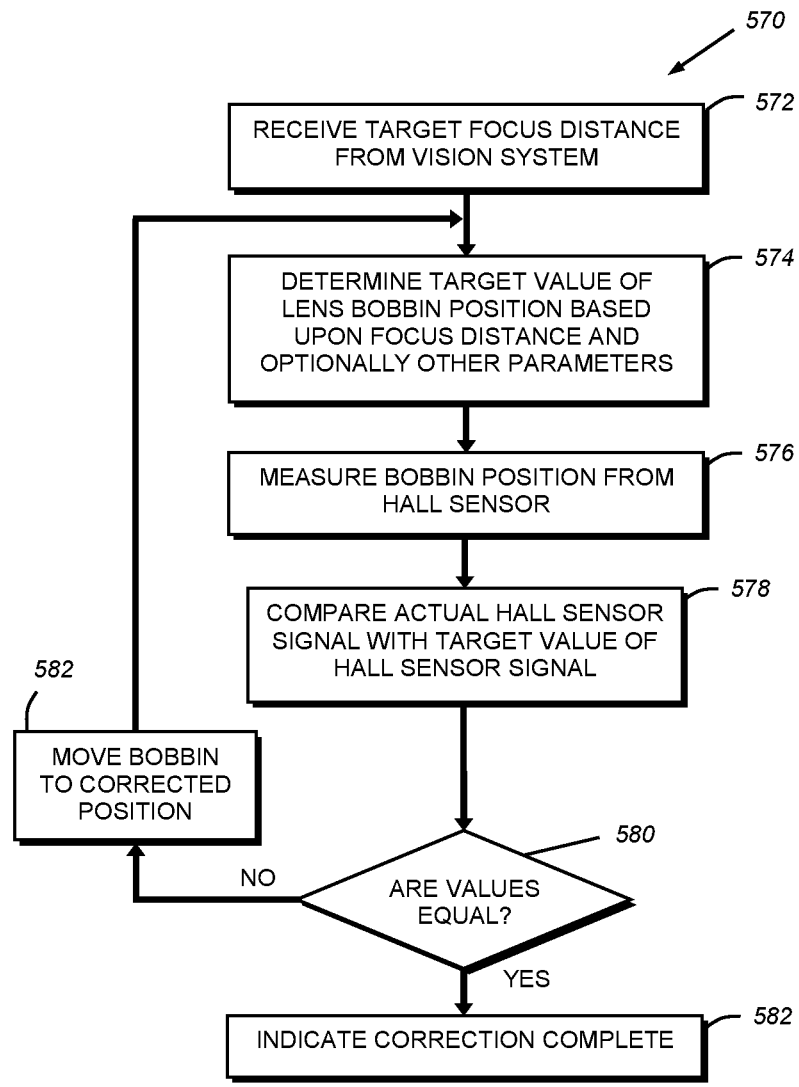
FIG. 5A is a flow diagram of a feedback loop-based bobbin position control process for the lens assembly of FIG. 1.

With reference to FIG. 5A, a bobbin position-sensing/correcting feedback loop process 570 is shown in a series of flow-diagram process steps. A target focus distance is received from the vision system processor in step 572. The control feedback loop 570 then initiates as this focus distance is used by the lens assembly control circuit (controller)

510 to determine a target value for bobbin position represented by a target Hall sensor value provided by one or more sensors on the bobbin. The target Hall sensor value(s) can be corrected based upon stored parameters in memory 512 (step 574). Such parameters include, but are not limited to temperature, spatial orientation and flange-to-sensor-distance tolerance, and this (optional) process is described further below. In step 576, the control circuit 510 measures the actual position of the bobbin based upon the position of the Hall sensor(s) and associated signal value(s) (562). In step 578, the control circuit 510 then compares the actual, returned Hall sensor value(s) with the target value. If the values are not substantially equal then decision step 580 branches to step 582 and the control circuit directs the current controller 544 to input a current that will move the bobbin to the corrected position. This can be based on the difference in current needed to move the bobbin between the actual and correct position. If the comparison in step 578 determines that the actual and target Hall sensor value(s) are substantially equal, then the decision step 580 branches to step 582 and the system indicates that correction is complete. The control circuit repeats correction steps 574, 576, 578, 580 and 582 until the actual and target Hall sensor values are substantially equal (within an acceptable tolerance), and the new correct bobbin position is indicated. This complete status can be reported to the camera's processor 522 for use in performing image acquisition.

Note that this local feedback loop 570 can run continuously to maintain focus at a set position once established, and until a new bobbin position/focus is directed by the camera. Thus, the feedback loop 570 ensures a steady and continuing focus throughout the image acquisition of an object, and does so in a manner that avoids increased burdens on the camera's vision system processor.

The determination of the target value for the Hall sensor (s) in step 574 can include optional temperature, spatial orientation and/or other parameter (e.g. flange distance) correction based upon parameters 612, 614, 616 (FIG. 6) stored in memory 512. Temperature of the lens unit is sensed (optionally) by an on-board or adjacent temperature sensor 588 (FIG. 5). The temperature sensor 588, like other components of the circuit 350, can employ a standard interface protocol (e.g. I2C).

Figure 7:
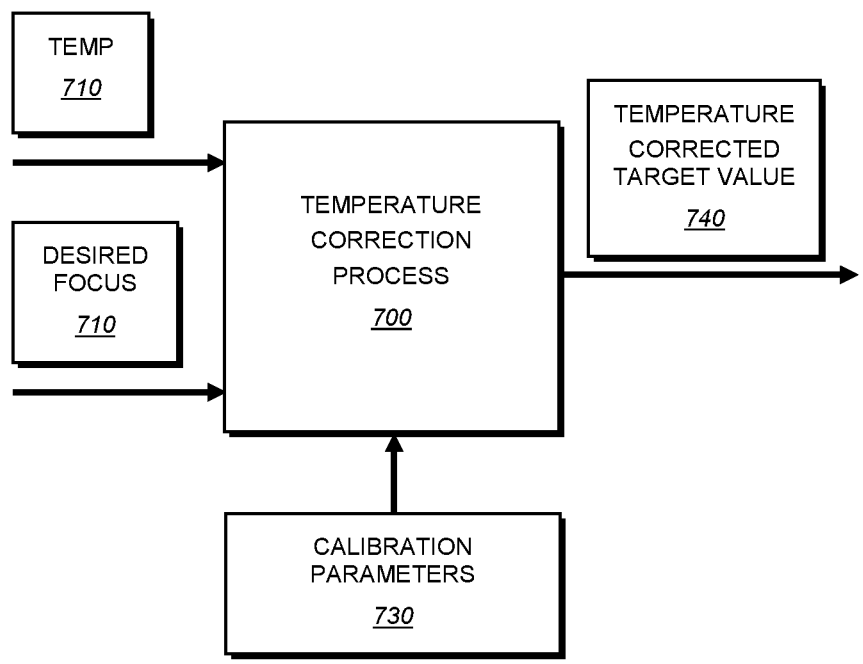
FIG. 7 is a temperature correction process that generates temperature-corrected bobbin position values for use with the control circuit of FIG. 5 and process of FIG. 5A.

As shown in FIG. 7, an optional temperature compensation process 700 operating within the control circuit 510 receives a temperature reading 710 from the sensor 536 and target focus or bobbin position information 720 and applies temperature calibration parameters 730. These can be stored locally on the lens assembly circuit memory 512 as shown in FIG. 6. The correction parameters can define a curve or a series of table values associated with given temperature readings that are measured during calibration. The process 700 modifies the target Hall sensor value (and associated bobbin position) from a base value, based upon the focus distance provided by the vision system camera to a value that accounts for the variation of lens focus with respect to lens temperature. Thus, the base Hall sensor value can be added-to or subtracted from by the control circuit 510 based upon the prevailing temperature reading at the lens to generate a temperature corrected target value 740.

Likewise, correction for orientation with respect to gravity that can result in sag or other geometric deformation of the lens membrane in differing ways is compensated by an (optional) accelerometer 594 that transmits the spatial orientation 596 of the lens/camera with respect to the acting directing of gravity to the control circuit via, for example, an I2C protocol. In an embodiment, an orientation correction factor is determined (by reading the accelerometer 594), and applied to the target Hall sensor value by the control circuit in a manner similar to temperature correction (FIG. 7) substituting orientation for temperature in block 710. Since orientation typically remains constant (except in the case of a moving camera), the determination of orientation can be a one-time event (i.e. at camera setup/calibration), or can occur upon start up or at a timed interval based upon the control circuit's clock. Like temperature correction, orientation correction parameters can comprise a curve or lookup table mapped to differing orientations, which can be determined during calibration. The appropriate orientation parameter value is applied to the step of determining (574) the target Hall sensor value, and the target value is adjusted to include this further correction for spatial orientation. Note that in the case of a moving camera, the orientation parameter can be continuously updated in the same manner that temperature is updated to account for changes over time.

Other parameters (616 in FIG. 6), such as flange-to-sensor distance tolerance, can also be stored in the circuit memory 512. These parameters can be updated from the data store of the vision system camera upon startup or at another interval of time. The value of each parameter is used by the control circuit's process to further adjust and correct the target Hall sensor value. This overall corrected value is used in the comparison step 578 against the actual measured value to thereby move the bobbin to the correct position.

III. Integrated Time-of-Flight Sensor

Figure 8:
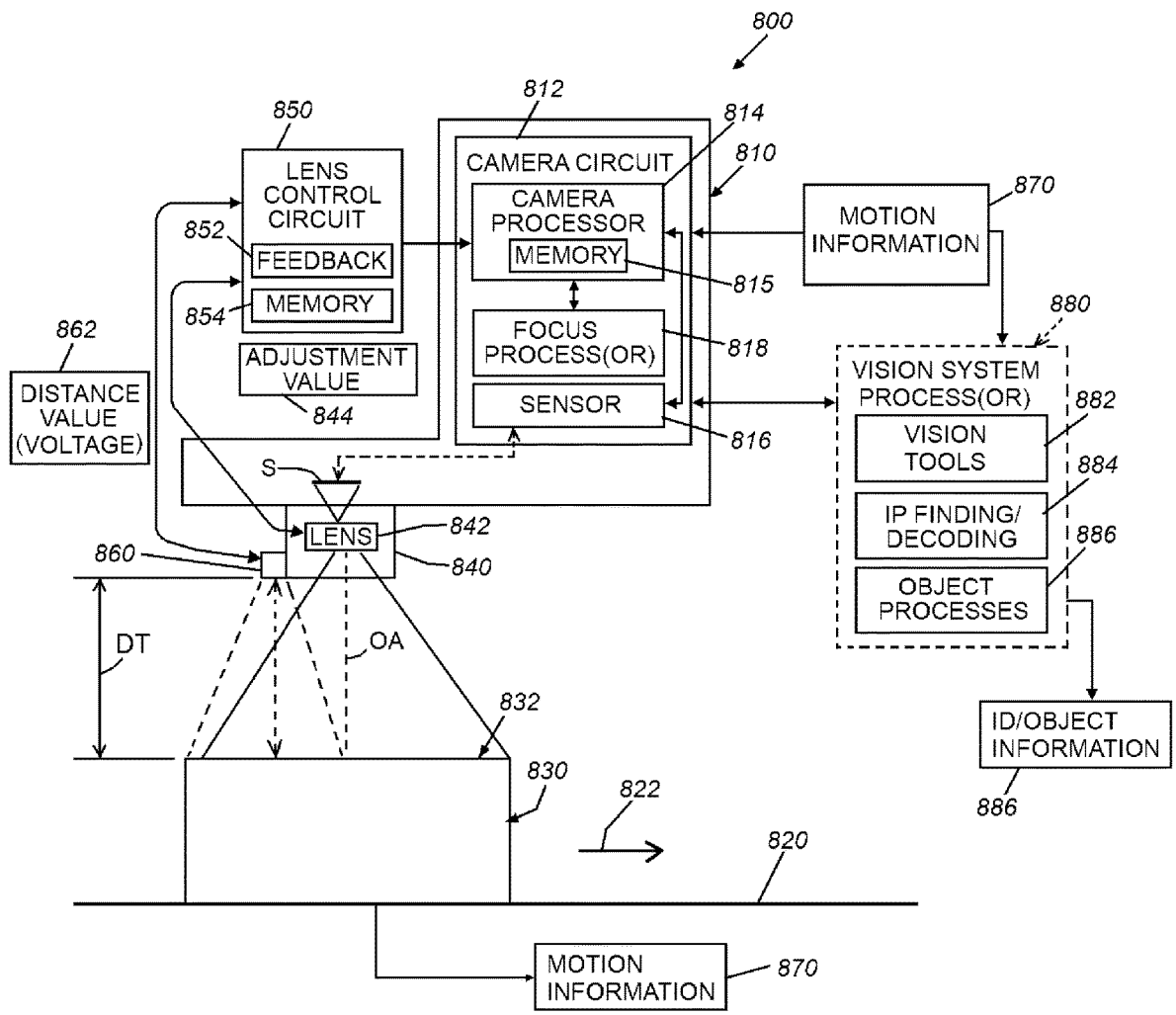
FIG. 8 is a diagram of a vision system, having an integrated time-of-flight sensor, acquiring an image and concurrent distance measurement of an exemplary object according to an embodiment.

FIG. 8 depicts a vision system arrangement 800 and associated vision system camera assembly 810 according to an exemplary embodiment. The camera assembly 810 can be any acceptable form factor, but typically includes a housing 812 that can be fixedly mounted with respect to a location, such as a conveyor 820 that moves (arrow 822) objects (e.g. boxes) 830 from a source to a destination. The vision system 800 and associated camera assembly 810 can be part of a logistics application that finds and decodes IDs printed or adhered to one or more surfaces (e.g. the top surface) 832 of the box 830. While the box has rectangular surfaces (i.e. is generally rectilinear), it can include sloped or curvilinear surfaces—for example a triangular-cross section or circular cross-section tube.

The camera assembly 810 can include and internal and/or external processing circuit 812 with associated image processor 814 and memory 815 that carries out general image acquisition and image processing tasks using image data received from the image sensor circuitry 816, which is associated with the (e.g.) CMOS image sensor S within the optics path. The camera circuit can include a focus processor 818, which can located in other modules in the overall vision system arrangement, such as the lens assembly 840 (and associated lens control circuit 850), as described generally above (see circuit 350 in FIG. 3. The lens assembly 840 includes a variable lens 842, such as the above-described liquid lens, that responds to adjustment information (e.g. voltage values) 844 to vary its focal distance. The lens assembly 840 can include an integrated or external control circuit 850 that can incorporate, or interoperate with, a feedback control circuit arrangement 852, as described generally above. Other circuit elements, such as a memory 854, can also be provided to the lens control circuit 850.

Notably, the lens assembly 840 (or another part of the camera assembly 810) can include a time-of-flight sensor 860 that is directed to sense distance (DT) between its emitter/receiver surface and a remote surface, such as the top

832 of a box 830. The time-of-flight sensor in this embodiment is a commercially available, single point unit, such as model number VL53L0X manufactured by STMicroelectronics of Switzerland, having the capability of operating at up to approximately fifty (50) cycles per second in a fast mode and with an operational range of approximately 2000 millimeters and accuracy to within a few centimeters, or less. Use of sensors from other manufacturers and/or other sensor models is expressly contemplated. As described further below, other models and types (differing operational theories) of time-of-flight sensors can be employed, including multi-point sensors. The time-of-flight sensor is advantageous in that it is widely available in a variety of specifications, compact, relatively low-power, fairly accurate and resistant to many environmental operational conditions. It is also fairly inexpensive, having a bulk unit cost as low as $1-2 dollars at present. The time-of-flight sensor operates by emitting a beam (via an emitter) in which its intensity is modulated at a high frequency, such that the emitted beam and the reflected beam (which is received by a receiver portion) exhibit a phase shift therebetween. The degree of phase shift is measured by the sensor's circuitry, which compares the phase at the emitter with that at the receiver. The measured phase shift is then converted to a distance measurement based on calibration parameters that reside within the sensor and/or external electronics. The time-of-flight sensor illuminates the entire scene is captured with a transmitted laser or (e.g. IR-based) light pulse. In some typical implementations of a time-of-flight sensor, the beam is emitted at an angle of up to approximately 30 degrees. However emission angles of 10-degrees or less can be appropriate for various applications. The returned distance value 862 from the sensor can be returned as a voltage or other data form—for example, a digital value—that represents the measured distance to the object surface. As shown, the sensor can be located slightly offset from the lens optical axis OA and achieve a desired measurement of the imaged surface. The sensor can be incorporated within the lens housing (viewing the imaged surface through a common front window), or can be located outside the lens housing. The sensor, can be part of an overall sensor circuit board with appropriate intervening optics to allow it to transmit light to and receive light from the object.

In the depicted, exemplary embodiment, the conveyor 820 generates (e.g. via an encoder) motion information 870 related to conveyor movement that is transmitted to various processes and processors, including the camera processor 814 and/or an illustrative vision system processor 880. The vision system processor can be enclosed entirely or partially within the camera housing, or can be external—for example, instantiated in a PC, laptop, server, handheld device, etc. The exemplary vision system processor 880 can include a variety of functional modules/processors, which perform one or more vision system processes, including vision tools 882, such as edge finders, blob analyzers, pattern recognition tools, etc. These vision tools 882 can be used to locate various features in acquired images, such as ID candidate features on a box surface. The vision system processor 880 of the exemplary embodiment also includes ID finding and decoding processes 884 that can identify and translate found ID candidate features into decoded information 886 (e.g. alphanumeric information), that is transmitted over an appropriate communication link to other devices and processes, such as a logistics tracking computer and/or conveyor line controller—for example a controller that starts and stops the line, sounds alarms, gates boxes to differing destinations based on the ID information. The exemplary vision system processor 880 also includes one or more functional modules/processors 888 that perform various, object-related processes in addition to lens autofocus, including region of interest detection, self-triggering of image acquisition/ID-decoding, defect detection and box size determination.

Figure 9:
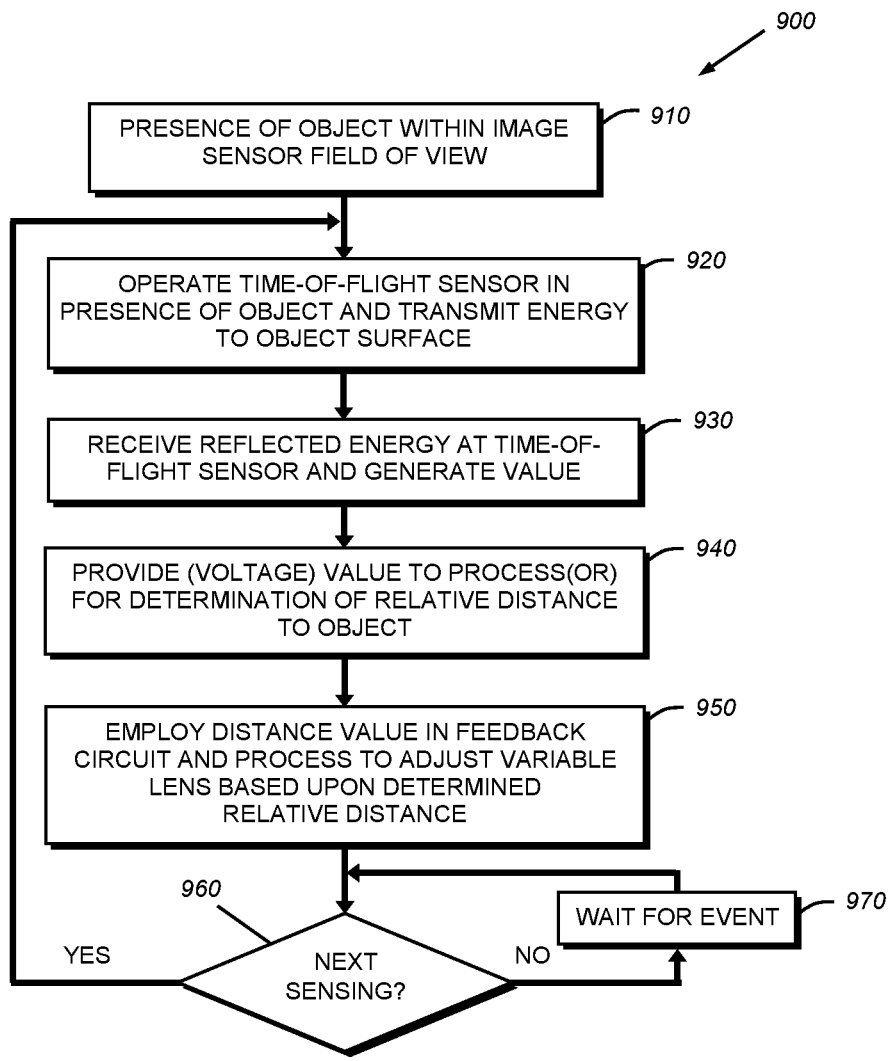
FIG. 9 is a flow diagram of a procedure for auto-focus of a variable (e.g. liquid) lens using the integrated time-of-flight sensor in the exemplary vision system of FIG. 8.

FIG. 9 depicts a (e.g.) runtime procedure 900 for autofocus of the variable (e.g. liquid) lens assembly based upon data from the time-of-flight sensor (860 in FIG. 8). Note that the temperature sensor, which is part of the above-described feedback circuit is read in combination with the initial distance provided by the time-of-flight sensor. As such, the initial runtime focus distance of the variable lens is set based on the measured distance and the measured temperature (which is processed by the above-described feedback circuit). This initial focus process can be performed at startup or on a periodic basis.

In step 910 of the autofocus procedure 900 an object or objects is/are located within the field of view of the camera assembly having an integrated time-of-flight sensor. The time-of-flight sensor operates by transmitting light energy to the object surface in step 920 and this light is reflected to (e.g.) a receiving point on the time-of-flight sensor in step 930. The phase shift between emitted and reflected/received beam is correlated with a distance value (e.g. a voltage value) representing the relative distance from the sensor to the object surface in step 940.

In step 950, and as described above, the feedback control's focus process (532 in FIG. 5) can employ distance data from the time-of-flight sensor to control the focal distance of the lens. The focus process, thus, inputs the sensed distance, and then charges lens focus distance using a look-up table and/or an algorithm that employs the distance value to vary the input voltage to the (e.g.) liquid lens. This process can be performed entirely within the on-board circuitry housed within the lens barrel. However, sensed distance data can also be provided to the camera processor 814 (and an optional or alternative on-board focus processor 818) and/or vision system processor 880 to perform autofocus and other above-described object processes (block 888). Images of the object surface are acquired once proper focus is achieved based on operation of the camera processor and/or vision system processor. Note that the time-of-flight sensor can be located at the camera sensor image plane, or at another location of known spacing, from the image plane. The spacing is accounted for in the overall computation of the focus distance.

In general, the time-of-flight sensor can be set to operate continuously at a predetermined cycle rate (e.g. thirty (30) cycles per second). In many commercially available sensors, the rate can be varied at least between a so-called slow or accurate mode and a fast mode. In the illustrative embodiment, the fast mode can be employed with reasonable accuracy. However, the slow mode is also available where greater accuracy is desired and the cycle rate is still acceptable. Thus, in the procedure 900 of FIG. 9, the sensor cycles continuously (decision step 960) returning a constant distance value equal to the distance from the conveyor (object support base) to the sensor until the next event 970 (i.e. the presence of an object in the field of view), at which time a new distance value is presented to refocus the lens (steps 920, et seq.). The lens can again refocus when the distance changes after the object has passed out of the field of view, or can maintain the same focus, or can go to a neutral focus setting. More generally, operation of lens autofocus can occur automatically/continuously based on instantaneous distance readings, or can operate only when objects are within, or not within, the field of view. Note that the distance measurement by the time-of-flight sensor, or at least the auto-focusing of the lens, should be completed before the subject image is captured. Thus, it is contemplated that there can be general synchronization between the image capture cycle (camera frame rate) and the measurement cycle of the time-of-flight sensor to implement this operation. A presence detector, such as an object detector (light beam, electric eye, etc.) or an encoder reading can be used to indicate presence of an object for operation of the vision system camera.

Figure 10:
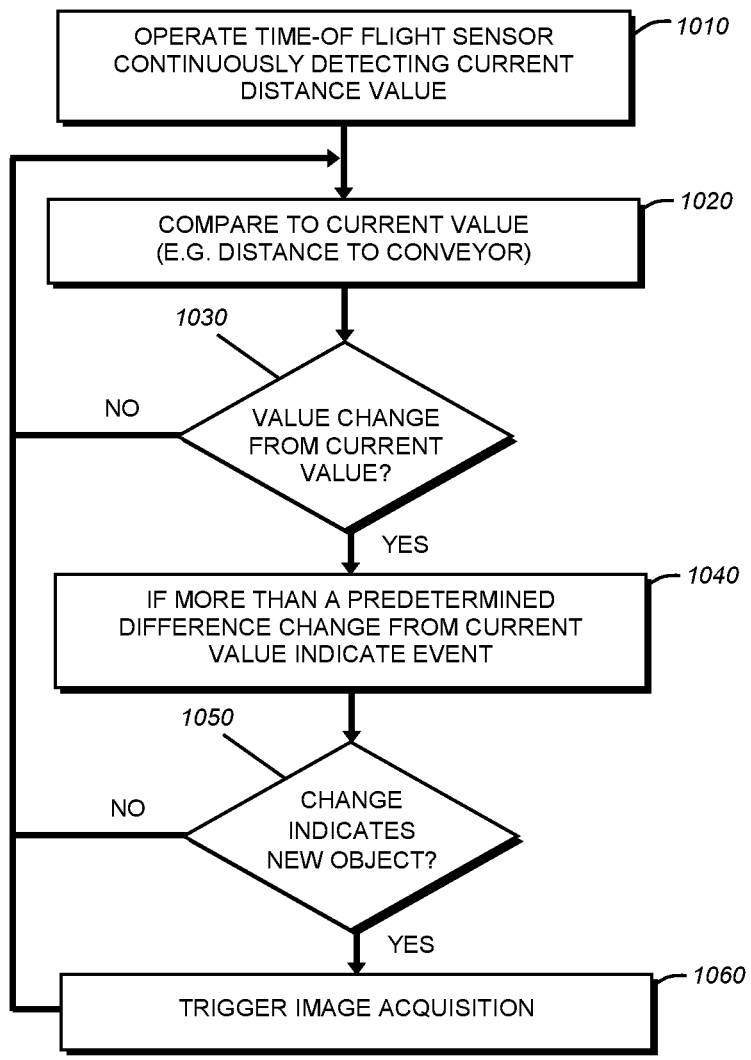
FIG. 10 is a flow diagram of a procedure for self-triggering image acquisition based on presence of an object with respect to the integrated time-of-flight sensor in the exemplary vision system of FIG. 8.

A further form of presence detection can be provided by the time-of-flight sensor itself. The FIG. 10 shows a self-triggering procedure 1000 in which detection of a height variation indicative of a positive object height relative to the conveyor/base surface is used to operate the vision system camera and trigger image acquisition. In step 1010, the time-of-flight sensor operates continuously, taking distance readings. The circuitry and/or process(or) compares the read distance to prior distance values and/or a baseline value range—for example the calibrated distance to the conveyor surface (step 1020). When an object (i.e. the object leading edge) enters the camera assembly's field of view and is picked up by the time-of-flight sensor, the read distance value changes (decision step 1030) based on the height of the object. The new distance value is used to establish presence and potentially a current object height. The object height is expected to be above a minimum height value (for example, above a baseline height that may be due to height fluctuations in the conveyor or the presence of debris), and if so then the procedure 100 indicates a trigger event in step 1040 and decision step 1050, in which the presence of an object has occurred. The procedure 1000 issues an appropriate trigger signal to the camera processor and/or vision system processor to acquire images of the field of view or (where continuous image acquisition occurs) flag the acquired images for analysis (step 1060).

Figure 11:
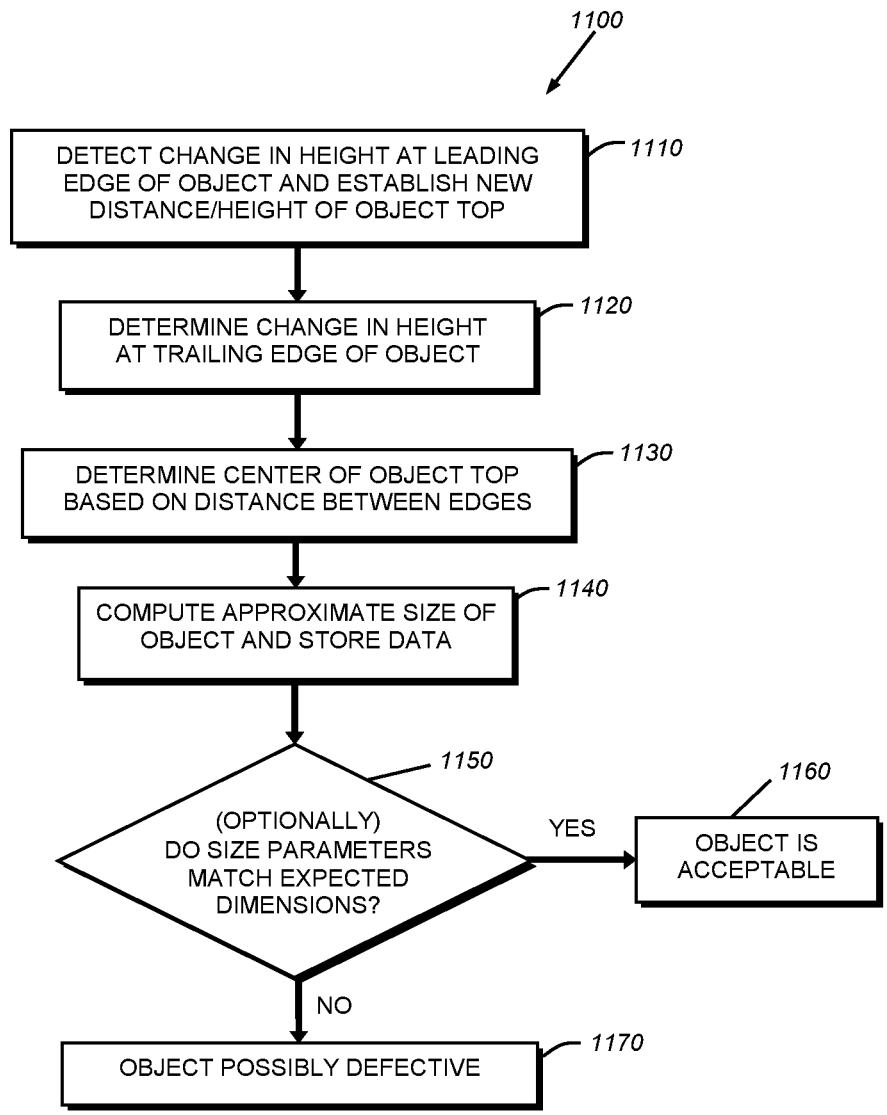
FIG. 11 is a flow diagram of a procedure for determining size of an object, and optionally object defects, using the integrated time-of-flight sensor in the exemplary vision system of FIG. 8.

With reference to FIG. 11, a procedure 1100 for determining height and/or size of an object is provided. During calibration, the height between the measurement base (conveyor, etc.) and the camera assembly image plane is measured and stored in the vision system. When the object's leading edge is detected in the field of view by the time-of-flight sensor, based a change in distance (step 1110), the height of that edge is determined and the processor(s) monitor(s) motion and height as the object passes through the field of view. The processor(s) tend detect the trailing edge through a second change in distance read by the sensor (step 1120). The locations of the edge transitions, combined with the degree of motion allow the length of the object to be computed from which a center can also be computed, and also a centroid, taking into account the height (step 1130). Based upon these parameters, the approximate three-dimensional size and dimensions can be estimated (step 1140).

According to a generalized method, the dimensions of an exemplary rectilinear object (e.g. a rectangular box) can be determined as follows: (a) measure distance between the image plane of the camera assembly and the box in the center of the acquired image; (b) search (using vision system tool) for a rectangular shape in the center of the image (i.e. top surface of the box); (c) calculate the dimensions of the top surface, based on the measured distance and the known optical properties of imager (sensor pixel array size, focal length, etc.); and (d) calculate the height of the box based on the measured shortest distance between camera image plane and box surface and the known height position of the camera relative to the measurement base (e.g. the conveyor surface, etc.).

In general the width of the object can also be estimated via an acquired image or approximated based on length and height (understanding that the conveyor or base defines a maximum width (e.g. 800 millimeters). Optionally, the size parameters can be compared to expected dimensions based upon a formula, look-up table of known package dimensions and/or the consistency of the height (i.e. is the top supposed to be planar?) in decision step 1150. If the object meets expectations, then it can be flagged as acceptable (and this data stored in (e.g.) a tracking database) in step 1160. Conversely if the comparison (decision step 1140) determines that one or more measured/estimated parameters deviate from acceptable limits, then the object is indicated as possibly (or definitely) defective (step 1170). As described further below, the measurement of dimensions and/or detection of defects can be performed using a multi-point time-of-flight sensor.

Figure 12:
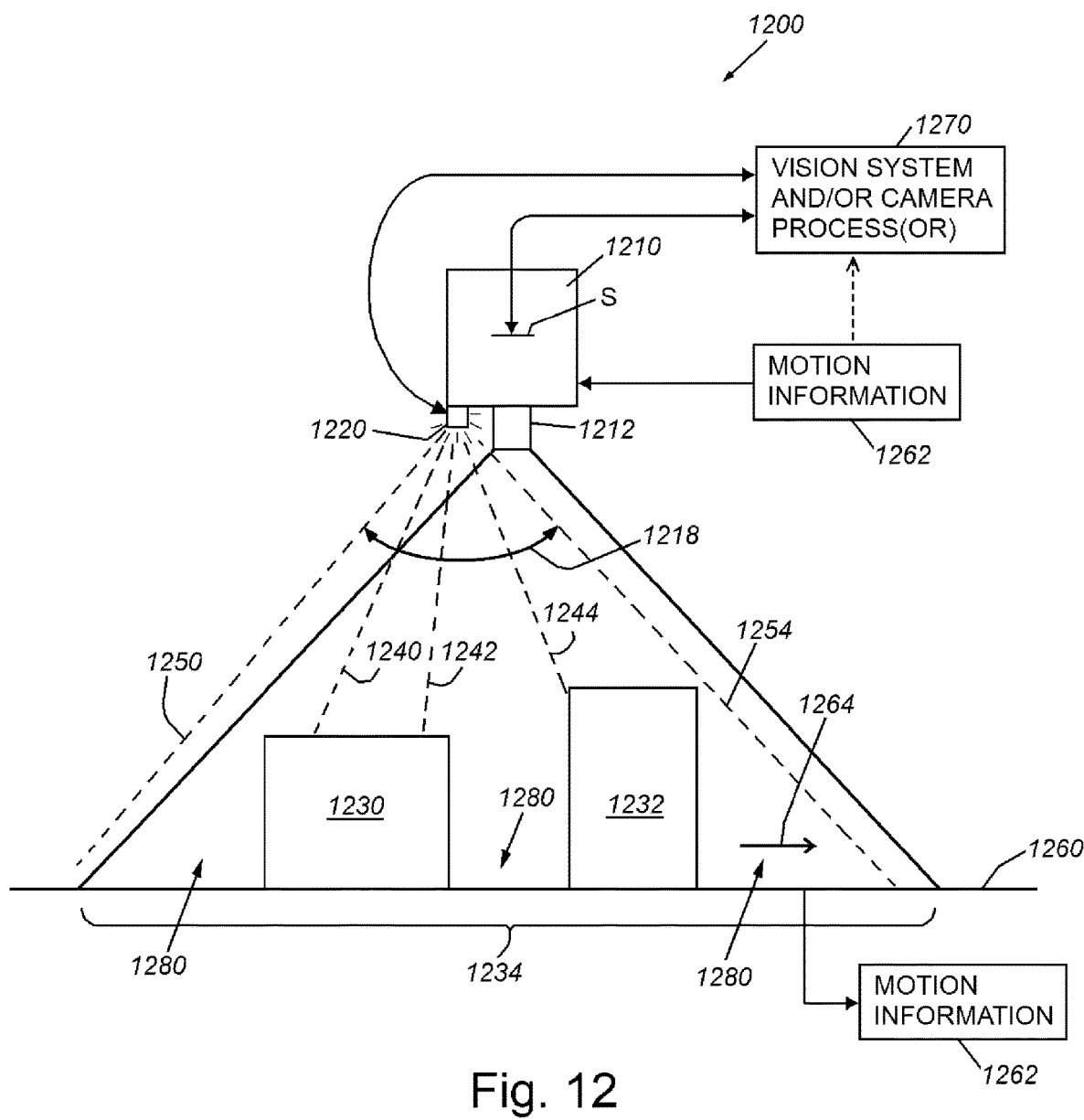
FIG. 12 is a diagram of a vision system, having an integrated, multi-point time-of-flight sensor, acquiring an image and matrix of associated distance measurements of a plurality of objects within a field of view of the vision system camera according to an exemplary embodiment.

While it is contemplated that various tasks herein can be performed using a single point time-of-flight sensor, commercially available sensors can be employed having a one-dimensional (n×1) or two-dimensional matrix (n×m) of sensing points that receive reflected light from various points of view (typically separated by a given angle throughout a maximum range (see angle 1218 below). By way of example, an 8×8 sensor can be employed. With reference to FIG. 12, a vision system arrangement 1200 is shown. The camera assembly 1210 in this embodiment includes an image sensor S and associated optics 1212 located adjacent to (or integrated with) a multi-point time-of-flight sensor 1220. As exemplary objects 1230 and 1232 pass through (or are presented to) the field of view 1234, a plurality of sensing points (e.g. points 1240, 1242 and 1244) read heights on each object. Other points (e.g. points 1250 and 1254) read the height of the base or conveyor 1260, which, when moving (arrow 1264), can transmit motion information 1262 to the processor(s) 1270 as shown. The matrix of time-of-flight sensing points generates a stream of one or two-dimensional height profiles that can be overlaid onto the image data in each acquired frame.

Figure 13:
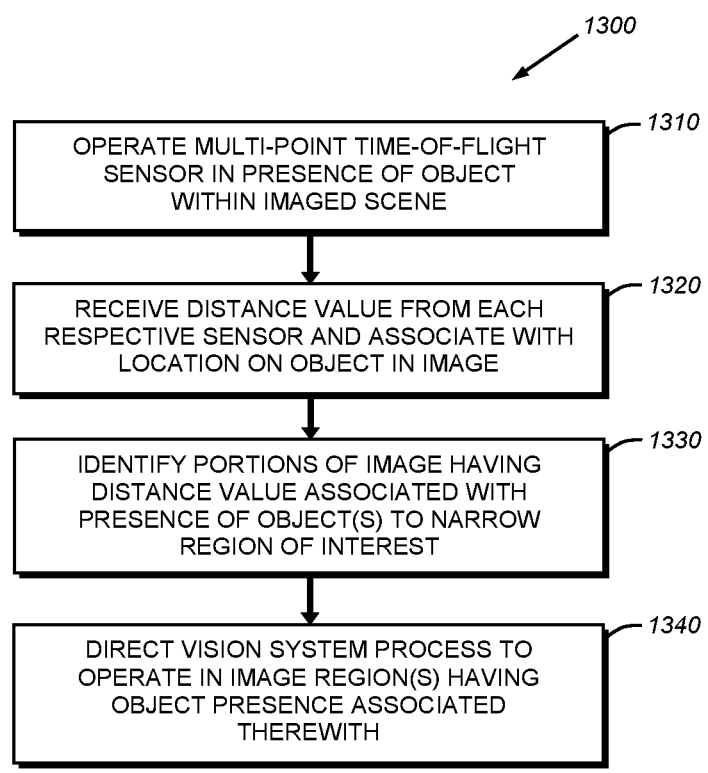
FIG. 13 is a flow diagram of a procedure for determining one or more region(s) of interest within an acquired image for (e.g.) finding and decoding ID features using information provided by the matrix of distance measurements of the exemplary vision system of FIG. 12.

Reference is made to FIG. 13, depicting a procedure 1300 for locating one or more regions of interest (ROIs) in an image containing one or more objects (for example objects 1230 and 1232 in FIG. 13). This function can be used to narrow the search area for ID features, allowing for more rapid decoding. In step 1310, the multi-point time-of-flight sensor is operated (for example on a continuous, cyclic basis) to take a matrix of height readings within the field of view. The received distance values are associated with a given angle within the field. The knowledge of this angle allows each point to be overlaid onto the acquired image at an appropriate location so that the given location within the image is assigned a corresponding height value (step 1320). The height values allow the image to be resolved in terms of locations having objects present and potentially the tops or sides of objects. For example, if adjacent points (e.g. 1240 and 1242 measure the same positive (above the base 1260) height, then the location is most likely a top surface. Points that measure two different positive heights can be imaging all or part of a side surface. As described above, points that measure the base distance are viewing gaps (1280 in FIG. 12) between objects. Thus, in step 1330, this information is used to determine locations in each acquired image in which object surfaces (regions of interest) are present and locations in the image(s) in which no object or a region of interest (e.g. a side surface) is present (step 1340). With this information, the vision system and ID decoding process can be directed to focus on such regions of interest. This reduces workload and speeds the overall ID finding and decoding process as it omits regions that are unlikely to contain meaningful (or any) ID information.

Figure 14:
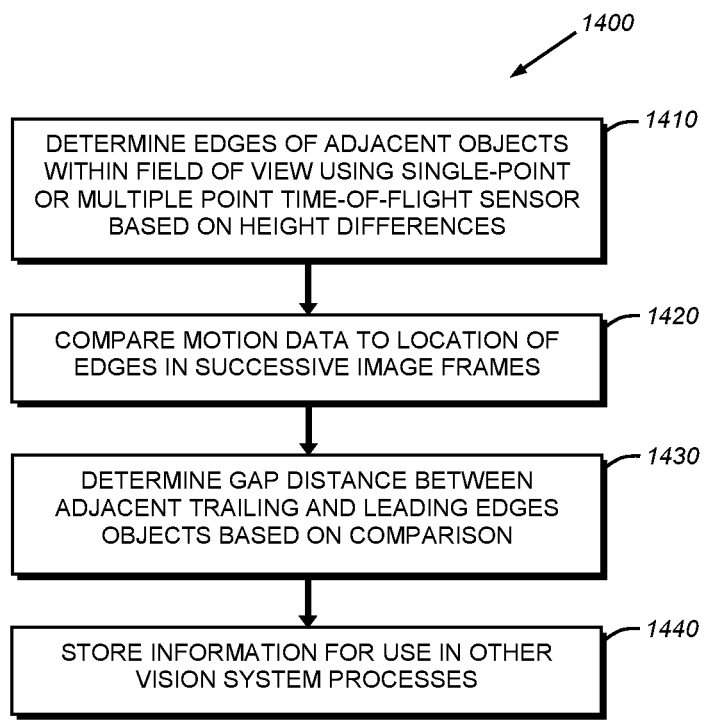
FIG. 14 is a flow diagram of a procedure for determining gaps between objects within an acquired image using information provided by distance measurements of the exemplary vision system of FIG. 8 or FIG. 12.

A related procedure 1400 is depicted in FIG. 14. Given a plurality of acquired images in succession, the arrangement 1200 (FIG. 12) can be employed to determine gap distances between objects. The multi-point (or single-point) time-of-flight sensor can determine where edges of adjacent objects occur based upon the difference between a maximum height reading (at an object top) and a minimum height reading (at the conveyor/base) in step 1410. The procedure 1400 can compare the location of the adjacent edges in each images and compare this to the determined motion (based on motion encoder information) in step 1420. Based upon this comparison, the gap distance between adjacent objects can be determined with relative accuracy in step 1430. The information can be stored and used in follow-on processes, such as acquisition triggering, region of interest analysis, etc. Notably, by tracking gap locations, the found IDs can be more reliably associated with the proper object in the image(s).

While the above-described embodiments show a single vision system camera and associated single-point or multi-point time of flight sensor, it is contemplated that a plurality of time-of-flight sensors can be used in conjunction with one or more vision system cameras, all (optionally) calibrated to a common coordinate system or frame of reference.

Figure 15:
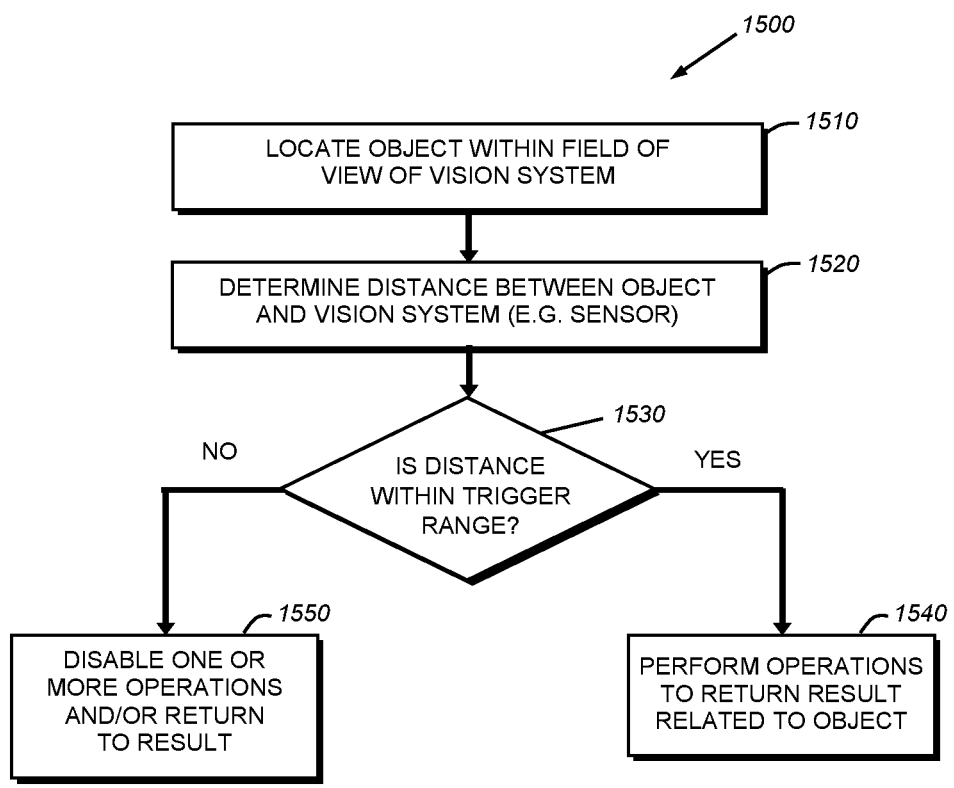
FIG. 15 is a flow diagram of a procedure for determining if an object is presented to the vision system based upon location of the object within a predetermined range, such as implemented in presentation mode.

FIG. 15 details another procedure 1500 in which the vision system (e.g. an ID-reading and decoding system) operates in a mode (for example, presentation mode) that only returns a usable result if the object is presented to the vision system within a predetermined range. That is, objects that pass through the field of view outside of the desired range are ignored by one or more steps of the vision system process. In step 1510, the object is located within the field of view, based on presence in an image acquired by the sensor and/or a change in distance measured by the time-of-flight sensor. The time-of-flight sensor determines the distance of the object (if possible) and returns this distance to the processor and its associated process modules in step 1520. The process modules include a stored distance range that act as a trigger for the return of a result to be used in a downstream task (e.g. a logistics task, object identification, etc. based on a read ID). The procedure 1500 compares (in decision step 1530) the returned distance measurement to the trigger range. In essence, the trigger range is adapted to limit the reading range of the vision system so as to prevent unintentional reading of an ID on an object. As described above, this can be part of a so-called presentation mode functionality within the vision system. If the distance to the object is within a defined trigger range, then (e.g.) the ID reader (a) captures an image, (b) initiates an ID-de decoding process, and/or (c) transmits the decoded data to the host system as a result for follow-on tasks (step 1540). If the distance to the ID code (as indicated by the time-of-flight sensor measurement) is outside this trigger range, then at least one of the above steps (a)-(c) in the overall ID-reading process can be disabled so a result is not generated or stored for downstream use in a task, etc. (step 1550).

IV. Conclusion

It should be clear that superior position correction, on the order of 1 millisecond, can be achieved using the local feedback loop instantiated in a control circuit packaged in the lens assembly. The entire lens assembly package fits within a standard C-mount lens affording a high degree of interoperability with a wide range of vision system camera models and types. The system and method for controlling and correcting the focus of a liquid (or other similar autofocusing) lens described herein can be employed rapidly, and at any time during camera runtime operation and generally free of burden to the camera's vision system processor. This system and method also desirably accounts for variations in focus due to thermal conditions and spatial orientation (i.e. lens sag due to gravity). This system and method more generally allow for a lens assembly that mounts in a conventional camera base.

The use of an integrated single-point or multi-point time-of-flight sensor in conjunction with a vision system camera arrangement can provide a variety of useful functions, such as autofocus, self-triggering, region of interest determination, controlling reading range (e.g. for use in ID-reader presentation mode), and/or object size/quality analysis. The wide availability, relatively low cost, reasonable speed and accuracy of such sensors renders them desirable for a variety of applications and allows their use on either a camera housing or interchangeable lens assembly.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while a Hall sensor is used to measure position, a variety of alternate position-sensing devices can be used in association with the feedback loop herein. For example an optical/interference-based position sensor can be employed in alternate embodiments. Also, it is contemplated that the principles herein can be applied to a variety of lenses (liquid and otherwise), in which the curvature of the lens is varied via electronic control. Thus the term "variable lens assembly" should be taken broadly to expressly include at least such lens types. In addition while various bobbin position corrections are performed within the lens control circuit and feedback loop, it is contemplated that some corrections can be performed within the vision system camera processor, and the corrected focal distance is then sent to the lens assembly for use in further feedback loop operations. As used herein, various directional and orientation terms such as "vertical", "horizontal", "up", "down", "bottom", "top", "side", "front", "rear", "left", "right", and the like, are used only as relative conventions and not as absolute orientations with respect to a fixed coordinate system, such as gravity. Accordingly, this description is meant to be taken only by way of example, and not to otherwise limit the scope of this invention.

What is claimed is:

1. A vision system comprising:
   a 2D image sensor;
   an imager lens that projects received light from a scene onto the image sensor, the imager lens having a variable liquid lens with an electrically controllable focus distance;
   a time-of-flight sensor that a receives a distance measurement from the scene;

a temperature sensor that generates a temperature measurement with respect to an ambient environment of the imager lens; and a variable liquid lens control circuit arranged to set the focus distance of the variable liquid lens based on the distance measurement and the temperature measurement, wherein the variable liquid lens control circuit comprises a feedback loop for maintaining lens focus at a set position by controlling a current through a lens actuator based on lens actuator position measurement and temperature measurement.

2. The vision system as set forth in claim 1, wherein the time-of-flight sensor is a single-point time-of-flight sensor.

3. The vision system as set forth in claim 2, wherein the variable liquid lens assembly comprises a membrane-based liquid lens assembly.

4. The vision system as set forth in claim 1, wherein the lens actuator includes a bobbin.

5. The vision system as set forth in claim 1, wherein the imager lens defines a removable lens assembly that includes the variable liquid lens and the variable liquid lens controller circuit operatively connected to the variable liquid lens, the variable liquid lens controller circuit being housed in the removable lens assembly.

6. The vision system as set forth in claim 5, wherein the time-of-flight sensor is contained integrally within the removable lens assembly and interconnected to the lens controller circuit.

7. A vision system comprising:

a 2D image sensor that acquires images of a scene;

an imager lens that projects received light from the scene onto the image sensor and has a variable liquid lens with an electrically controllable focus distance;

a time-of-flight sensor that a receives a distance measurement from the scene;

a temperature sensor that generates a temperature measurement with respect to an ambient environment of the imager lens;

a variable liquid lens control circuit arranged to set the focus distance of the variable liquid lens based on the distance measurement and the temperature measurement, wherein the variable liquid lens control circuit comprises a feedback loop for maintaining lens focus at a set position by controlling a current through a lens actuator based on lens actuator position measurement and temperature measurement; and a processor arranged to receive distance data from the time-of-flight sensor, and based upon the distance data determine one or more height measurements with respect to one or more objects within the scene so as to perform an analysis process on the one or more objects determined based at least in part on the one or more height measurements.

8. The vision system as set forth in claim 7, wherein the one or more objects define a rectilinear shape and the analysis process defines measuring dimensions of the one or more objects by (a) measuring a distance between the image sensor and the object in the center of the image; (b) searching for a rectangular shape in the center of an image acquired by the image sensor with one or more vision system tools, (c) computing dimensions of a top surface of the one or more objects relative to the rectangular shape, based on the measured distance and known optical properties of image sensor and imager lens, and (d) calculating a height of the one or more objects, based on a measured shortest distance between the image sensor and the top surface and a known height position of the image sensor based upon a reference surface.

9. The vision system as set forth in claim 7, wherein the reference surface comprises a moving conveyor that passes the one or more objects through the scene.

10. The vision system as set forth in claim 7, wherein the processor is arranged to determine deviations from the rectilinear shape to determine a defect in the one or more objects.

11. The vision system as set forth in claim 7, wherein the one or more objects are in relative motion with respect to the image sensor and the time-of-flight sensor.

12. The vision system as set forth in claim 7, wherein the image sensor and the imager lens are mounted to acquire images image the one or more objects transported on a conveyor through a scene and are operatively connected to an ID decoder that finds and decodes ID information on the one or more objects.

13. The vision system as set forth in claim 7, wherein the time-of-flight sensor is a single-point time-of-flight sensor.

14. The vision system as set forth in claim 7, wherein the time-of-flight sensor is a multi-point time-of-flight sensor.

15. The vision system as set forth in claim 14, wherein the processor receives a plurality of height values concurrently from the multi-point time-of-flight sensor relative to discrete parts of the scene, and based on the measured height values defines at least one region of interest with respect to the one or more objects.

16. The vision system as set forth in claim 7, further comprising an ID decoder that receives image data from the scene and locates and decodes ID information within the at least one region of interest.

17. The vision system as set forth in claim 7, further comprising an ID decoder that receives image data from the scene and locates and decodes ID information from the image data, and wherein the processor is arranged to detect a plurality of objects based on the height values in the scene and to associate one or more located IDs relative to respective of the plurality of objects.

18. The vision system as set forth in claim 7, wherein the imager lens defines a removable lens assembly that includes the variable liquid lens and the variable liquid lens controller circuit operatively connected to the variable liquid lens, the variable liquid lens controller circuit being housed in the removable lens assembly.

19. The vision system as set forth in claim 18, wherein the time-of-flight sensor is contained integrally within the removable lens assembly and interconnected to the lens controller circuit.

20. The vision system as set forth in claim 7, wherein the lens actuator includes a bobbin.

* * * * *